US010918250B2

(12) United States Patent
Lee et al.

(10) Patent No.: US 10,918,250 B2
(45) Date of Patent: Feb. 16, 2021

(54) ROBOT VACUUM CLEANER

(71) Applicant: Samsung Electronics Co., Ltd., Suwon-si (KR)

(72) Inventors: Byoung In Lee, Suwon-si (KR); Young Ho Ko, Hwaseong-si (KR); Ji Won Choi, Suwon-si (KR); Hak Bong Lee, Suwon-si (KR); Seung Il Han, Incheon (KR); Myeong Ho Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 138 days.

(21) Appl. No.: 15/788,022

(22) Filed: Oct. 19, 2017

(65) Prior Publication Data

US 2018/0103812 A1    Apr. 19, 2018

(30) Foreign Application Priority Data

Oct. 19, 2016   (KR) .................. 10-2016-0135608
Jan. 3, 2017    (KR) .................. 10-2017-0000599

(51) Int. Cl.
*A47L 9/06*    (2006.01)
*A47L 5/22*    (2006.01)
(Continued)

(52) U.S. Cl.
CPC ............... *A47L 9/0653* (2013.01); *A47L 5/22* (2013.01); *A47L 9/0477* (2013.01);
(Continued)

(58) Field of Classification Search
CPC .... A47L 9/0653; A47L 9/0633; A47L 9/2826; A47L 9/2847; A47L 9/0477;
(Continued)

(56) References Cited

U.S. PATENT DOCUMENTS 6,763,549 B1 * 7/2004 Peters ...................... A47L 5/26
15/374
8,382,906 B2 * 2/2013 Konandreas ....... A22C 17/0013
134/21
(Continued)

FOREIGN PATENT DOCUMENTS

CN      103654641       3/2014
EP      0885586         12/1998
(Continued)

OTHER PUBLICATIONS

International Search Report dated Jan. 25, 2018 in International Patent Application No. PCT/KR2017/011544.
(Continued)

*Primary Examiner* — Orlando E Aviles
*Assistant Examiner* — Robert F Neibaur
(74) *Attorney, Agent, or Firm* — Staas & Halsey LLP

(57) ABSTRACT

A robot vacuum cleaner that may increase cleaning efficiency around obstacles includes a main body having an intake to suck in dust and air while the main body is driven on a floor, a shutter installed in front of the intake to be able to move from the main body toward the floor, and a shutter driver configured to supply power to move the shutter.

19 Claims, 28 Drawing Sheets

(51) Int. Cl.
*A47L 9/04* (2006.01)
*A47L 9/28* (2006.01)
*B25J 9/00* (2006.01)
*B25J 11/00* (2006.01)
*G05D 1/02* (2020.01)

(52) U.S. Cl.
CPC ........... *A47L 9/0673* (2013.01); *A47L 9/2826* (2013.01); *A47L 9/2847* (2013.01); *B25J 9/0003* (2013.01); *B25J 11/0085* (2013.01); *G05D 1/0214* (2013.01); *G05D 1/0227* (2013.01); *G05D 1/0242* (2013.01); *G05D 1/0255* (2013.01); *A47L 2201/04* (2013.01); *A47L 2201/06* (2013.01); *G05D 2201/0215* (2013.01)

(58) Field of Classification Search
CPC ............... A47L 9/2836; A47L 2201/06; A47L 2201/04; A47L 5/22; A47L 5/14; A47L 5/00; A47L 5/02; A47L 9/08; A47L 5/38; B08B 5/00; B80B 5/02; B23Q 11/005
USPC ....... 15/319, 378, 301, 225, 316.1, 405, 406
See application file for complete search history.

(56) References Cited

U.S. PATENT DOCUMENTS

| | | | | |
|---|---|---|---|---|
| 8,732,903 | B2 * | 5/2014 | Splinter | A47L 9/06 15/319 |
| 8,806,711 | B2 * | 8/2014 | Jang | A47L 9/009 15/319 |
| 9,144,356 | B2 * | 9/2015 | Yun | A47L 9/0477 |
| 9,510,720 | B2 * | 12/2016 | Jang | A47L 11/4069 |
| 2008/0120801 | A1 * | 5/2008 | Kim | A47L 9/06 15/383 |
| 2009/0100630 | A1 * | 4/2009 | Kim | A47L 9/1463 15/319 |
| 2009/0229075 | A1 * | 9/2009 | Eriksson | A46B 13/006 15/383 |
| 2010/0313364 | A1 | 12/2010 | Chung et al. | |
| 2012/0054980 | A1 | 3/2012 | Kim et al. | |
| 2015/0074939 | A1 * | 3/2015 | Cipolla | A47L 5/30 15/354 |
| 2015/0297047 | A1 * | 10/2015 | Van Der Kooi | A47L 7/0009 15/364 |

FOREIGN PATENT DOCUMENTS

| | | | | |
|---|---|---|---|---|
| EP | 2050380 | | 4/2009 | |
| EP | 3461385 | A1 * | 4/2019 | ........... A47L 9/0626 |
| GB | 2140673 | * | 12/1984 | ............... A47L 9/02 |
| JP | 2003-135330 | | 5/2003 | |
| JP | 2006-296684 | | 11/2006 | |
| JP | 2010-29661 | | 2/2010 | |
| KR | 20-1999-001211 | | 1/1999 | |
| KR | 10-2006-0003189 | | 1/2006 | |
| KR | 10-2006-0081131 | | 7/2006 | |
| KR | 10-2013-0107642 | | 10/2013 | |
| KR | 10-2015-0143208 | | 12/2015 | |
| WO | 2015/137561 | | 9/2015 | |

OTHER PUBLICATIONS

Extended European Search Report dated Jul. 9, 2019 in European Patent Application No. 17861383.2.
Chinese Office Action dated Aug. 21, 2020 in Chinese Patent Application No. 201780074578.3.

* cited by examiner

ROBOT VACUUM CLEANER

CROSS-REFERENCE TO RELATED APPLICATIONS

This application claims priority to and the benefit of Korean Patent Application No. 10-2016-0135608, filed on Oct. 19, 2016 in the Korean Intellectual Property Office, and Korean Patent Application No. 10-2017-0000599, filed on Jan. 3, 2017 in the Korean Intellectual Property Office, the disclosures of which are incorporated herein by reference in their entirety.

BACKGROUND

1. Field

The following description relates to a robot vacuum cleaner, and more particularly, to an improved robot vacuum cleaner that is able to increase cleaning efficiency around obstacles, including a wall, for example.

2. Description of the Related Art

Robot cleaners are devices to clean dust and the like removed from the floor while being driven on a cleaning area without intervention from a user. The robot vacuum cleaner may control a driving device to thoroughly clean the area and control a cleaning device to efficiently remove the dirt.

General robot cleaners detect a distance to an obstacle, such as furniture, an office supply, and a wall in an area to be cleaned with many different kinds of sensors, and clean the area while being driven not to collide with the obstacle based on the detected information.

Cleaning a given area with the robot vacuum cleaner is a process of the robot vacuum cleaner repeatedly performing cleaning while being driven in a preset driving pattern.

SUMMARY

An aspect of the present disclosure is to provide an improved robot vacuum cleaner that is able to increase cleaning efficiency around the walls or obstacles.

An aspect of the present disclosure is to provide a robot vacuum cleaner that is able to increase cleaning performance with limited suction power in an area adjacent to the walls or obstacles.

An aspect of the present disclosure is to provide a robot cleaner that is able to increase flank cleaning performance.

In accordance with an aspect of the embodiments, a robot vacuum cleaner comprises a main body having an intake to suck in dust and air while the main body is driven on a floor; a shutter installed in front of the intake to be able to move from the main body toward the floor; and a shutter driver arranged to supply power to move the shutter.

Also, the robot vacuum cleaner comprises a power transfer link movably connected to transfer the power of the shutter driver to the shutter.

Also, the robot vacuum cleaner comprises a shaft arranged to transfer a rotational force of the shutter driver to the power transfer link.

Also, the shutter is hinged to be engaged with the power transfer link.

Also, the robot vacuum cleaner comprises a driving gear rotated by the shutter driver; a first gear part formed on the shaft to be interlocked with the driving gear; and a second gear part formed to be interlocked with the first gear to make the power transfer link rotatable.

Also, the second gear part is formed in at least a portion of the power transfer link.

Also, the robot vacuum cleaner further comprises a sensor installed in the main body to detect an obstacle, wherein the shutter is drawn out from the main body at a point adjacent to the obstacle if the sensor detects the obstacle.

Also, the robot vacuum cleaner further comprises a controller installed in the main body, wherein the controller is configured to move the main body backward with the shutter drawn out from the main body and move the main body forward with the shutter put into the main body, if the sensor detects the obstacle.

Also, the robot vacuum cleaner further comprises a connection link connecting between the shutter and the shaft, wherein the connection link is rotationally connected to the shutter.

Also, the power transfer link comprises a timing belt arranged to connect between the shutter driver and the shutter.

Also, the shutter is arranged to come into contact with the floor at a point adjacent to the obstacle while the main body is being driven.

Also, at least a part of the shutter is formed of a soft material.

Also, the shutter has a portion contacting the floor formed of a soft material.

Also, the main body is configured to repeatedly perform cleaning if the sensor detects a corner.

Also, the robot vacuum cleaner further comprises an anti-lifter arranged to guide the power transfer link.

Also, the intake includes nozzle blades arranged to form a suction path, the nozzle blades being detachably mounted on the intake.

Also, the nozzle blades comprises a main fluid path former to form a first suction path connected to the intake from the front of the intake; and a flank fluid path former to form a second suction path connected to the intake from the flank of the intake.

Also, the main fluid path former comprises a plurality of main fluid path blades arranged to guide air flowing in through the first suction path to the intake.

Also, the flank fluid path former comprises a flank fluid path blade slantingly arranged to the flank of the intake such that air flows into the second suction path.

Also, at least a part of the flank fluid path blade includes an elastic material.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

DETAILED DESCRIPTION

Figure 1:
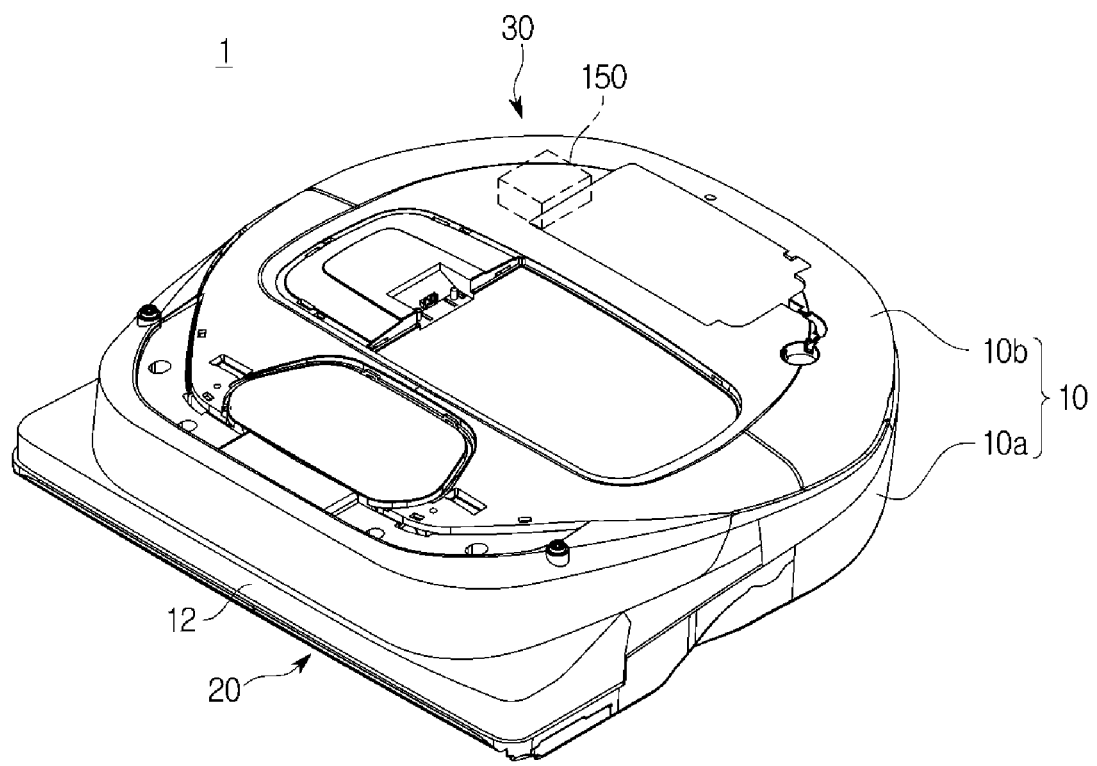
FIG. 1 is a perspective view of a robot vacuum cleaner, according to an embodiment of the present disclosure.

Embodiments and features as described and illustrated in the present disclosure are only examples, and various modifications thereof may also fall within the scope of the disclosure.

Throughout the drawings, like reference numerals refer to like parts or components.

The terminology used herein is for the purpose of describing particular embodiments only and is not intended to limit the present disclosure. It is to be understood that the singular forms "a," "an," and "the" include plural references unless the context clearly dictates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The terms including ordinal numbers like "first" and "second" may be used to explain various components, but the components are not limited by the terms. The terms are only for the purpose of distinguishing a component from another. Thus, a first element, component, region, layer or section discussed below could be termed a second element, component, region, layer or section without departing from the teachings of the present disclosure. Descriptions shall be understood as to include any and all combinations of one or more of the associated listed items when the items are described by using the conjunctive term "~ and/or ~," or the like.

Reference will now be made in detail to embodiments, examples of which are illustrated in the accompanying drawings, wherein like reference numerals refer to the like elements throughout.

The terms front and forward as herein used refer to a front face and front direction viewed from a robot vacuum cleaner 1 as shown in FIG. 1, and a rear direction refers to a direction facing the back of the robot vacuum cleaner 1.

Figure 2:
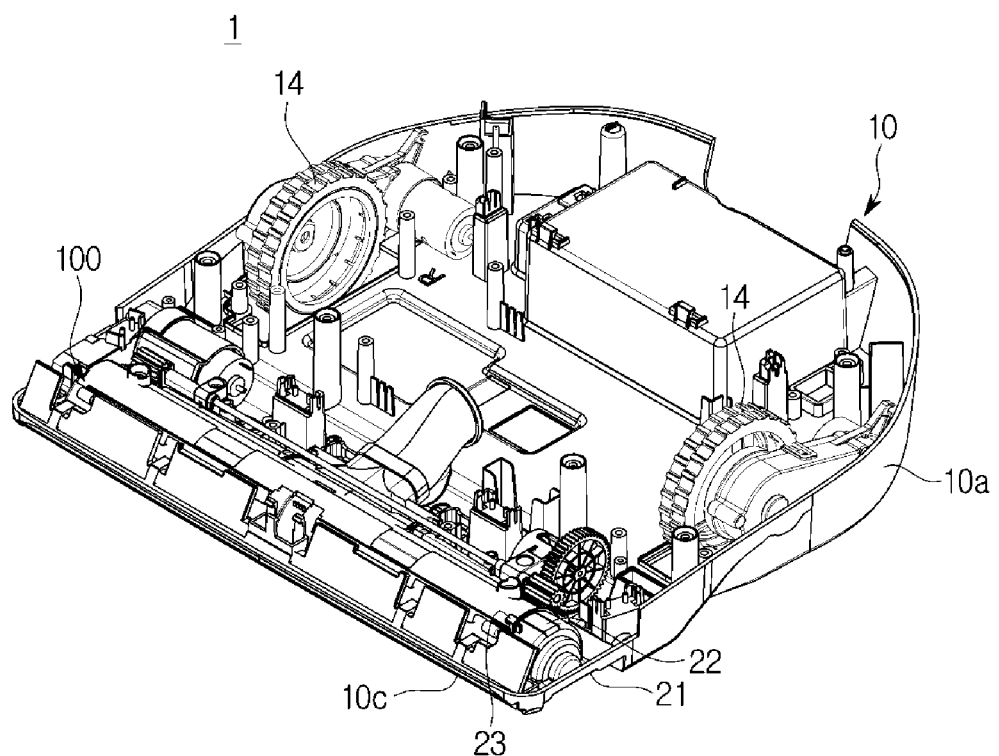
FIG. 2 is a perspective view illustrating the robot vacuum cleaner with some parts separated therefrom, according to the embodiment of the present disclosure.
Figure 3:
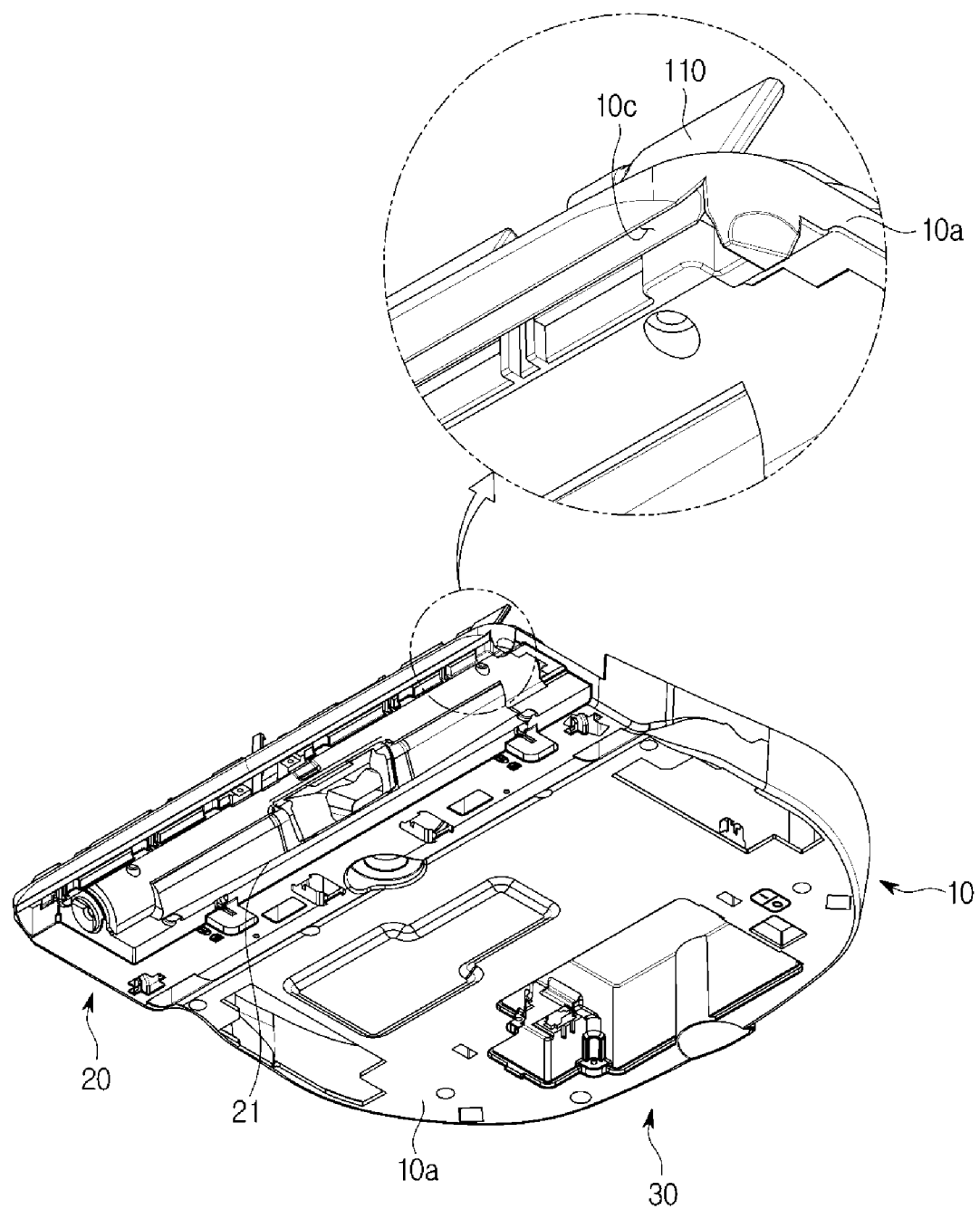
FIG. 3 is a bottom view of the robot vacuum cleaner, according to the embodiment of the present disclosure.

FIG. 1 is a perspective view of a robot vacuum cleaner, according to an embodiment of the present disclosure, FIG. 2 is a perspective view illustrating the robot vacuum cleaner with some parts separated therefrom, according to the embodiment of the present disclosure, and FIG. 3 is a bottom view of the robot vacuum cleaner, according to the embodiment of the present disclosure.

As shown in FIGS. 1 to 3, the robot vacuum cleaner 1 may include a main body 10 forming the external appearance, and a wheel 14 arranged for the main body 10 to be moved around an area to be cleaned.

The main body 10 may support various kinds of parts installed in the main body 10 as well as form the exterior of the robot vacuum cleaner 1. The main body 10 may have various shapes. For example, the main body 10 may have a rectangular shape. Although the embodiment shows the main body 10 of the embodiment having a rectangular front and a round backside, the present disclosure is not limited thereto. For example, the main body may have the form of a rectangle as a whole. The main body 10 in such a rectangular form has an advantage of being able to clean even the corners between walls.

The main body 10 may include a base 10a forming the bottom and a cover 10b forming the top. The main body 10 may also include a suction part 20 forming the front of the exterior and a main part 30 forming the backside of the exterior. The suction part 20 may have an intake 21 formed on the bottom to suck in dust and air. The cover 10b may be formed to cover the suction part 20 and the main part 30. The cover 10b may be installed to separately cover the suction part 20 and the main part 30. A pair of wheels 14 may be symmetrically installed in the main part 30 on the left and right sides. The wheels 14 may be installed in the base 10a. The wheels 14 are powered from a driving motor (not shown) to move the main body 10 in an area to be cleaned.

A controller 150 is provided inside the main body 10 to control operation of the robot vacuum cleaner 1. The controller 150 may control movement of the robot vacuum cleaner 1 by controlling the wheels 14.

The robot vacuum cleaner 1 may have a bumper 12 to absorb an external shock while being driven. The bumper 12 may be equipped on each of the front and the backside of the robot vacuum cleaner 1. The bumper 12 may be mounted on each of the front and the backside of the base 10*a*. Although the embodiment of the present disclosure shows the bumper 12 installed on the front of the base 10*a*, the present disclosure is not limited thereto. For example, the bumper 12 may be installed on the cover 10*b*, or may be separately provided between the base 10*a* and the cover 10*b*

A sensor 13 may be equipped in the main body 10. The sensor 13 included in the main body 10 may detect obstacles or walls. There may be at least one or more sensors 13. The sensor 13 may include at least one of infrared, ultrasonic, and contact sensors. The sensor 13 may be arranged on the front or the flank of the main body 10.

The sensor 13 may detect an obstacle or a wall in front of the main body 10 or in the driving direction of the robot vacuum cleaner 1, detect a distance thereto, and send the distance information to the controller 150 inside the main body 10. The sensor 13 may be arranged to have a predetermined height on the cover 10*b* of the main body 10. The sensor 13 may be arranged on the front of the bumper 12. The sensor 13 installed on the bumper 12 may include a contact sensor configured to detect contact of the bumper 12 of the robot vacuum cleaner 1 against the obstacle or the wall while the robot vacuum cleaner 1 is being driven.

The suction part 20 of the main body 10 may be configured to suck in dirt on the floor together with air through a suction force. The suction part 20 may include the intake 21 formed on the front of the main body 10. A drum brush 40 may be installed on the intake 21 to sweep up dust on the floor. In order for the drum brush 40 to be installed, the suction part 20 may include a drum brush install part 22 to form space for receiving the drum brush 40. The drum brush install part 22 may be in the semi-circular form to correspond to the figure of the drum brush 40. The drum brush 40 may be rotationally installed in the drum brush install part 22. The drum brush 40 may sweep up dust on the floor while being rotated. The drum brush 40 may sweep up the dust or foreign materials on the floor through the intake 21 formed on the bottom face of the main body 10. Although not shown, there may be a blower in the main body 10 to generate suction power, forcing the air and dust flowing in through the intake 21 to be moved to a dust collector.

A shutter assembly 100 including a shutter 110, which may be drawn out from or put into the main body 10, may be installed in front of the suction part 20. The shutter 110 may be arranged lengthwise in front of the suction part 20. The shutter 110 may be arranged lengthwise in front of the drum brush 40. A shutter install part 10*c* may be formed in front of the suction part 20 for the shutter 110 to be installed therein by passing through the shutter install part 10*c*. The shutter install part 10*c* may be formed on the front of the base 10*a*.

Reference numeral 10*d* indicates a motor install part formed in the main body 10 for a motor 121 of a shutter driver 120, which will be described below, to be installed therein.

Figure 4:
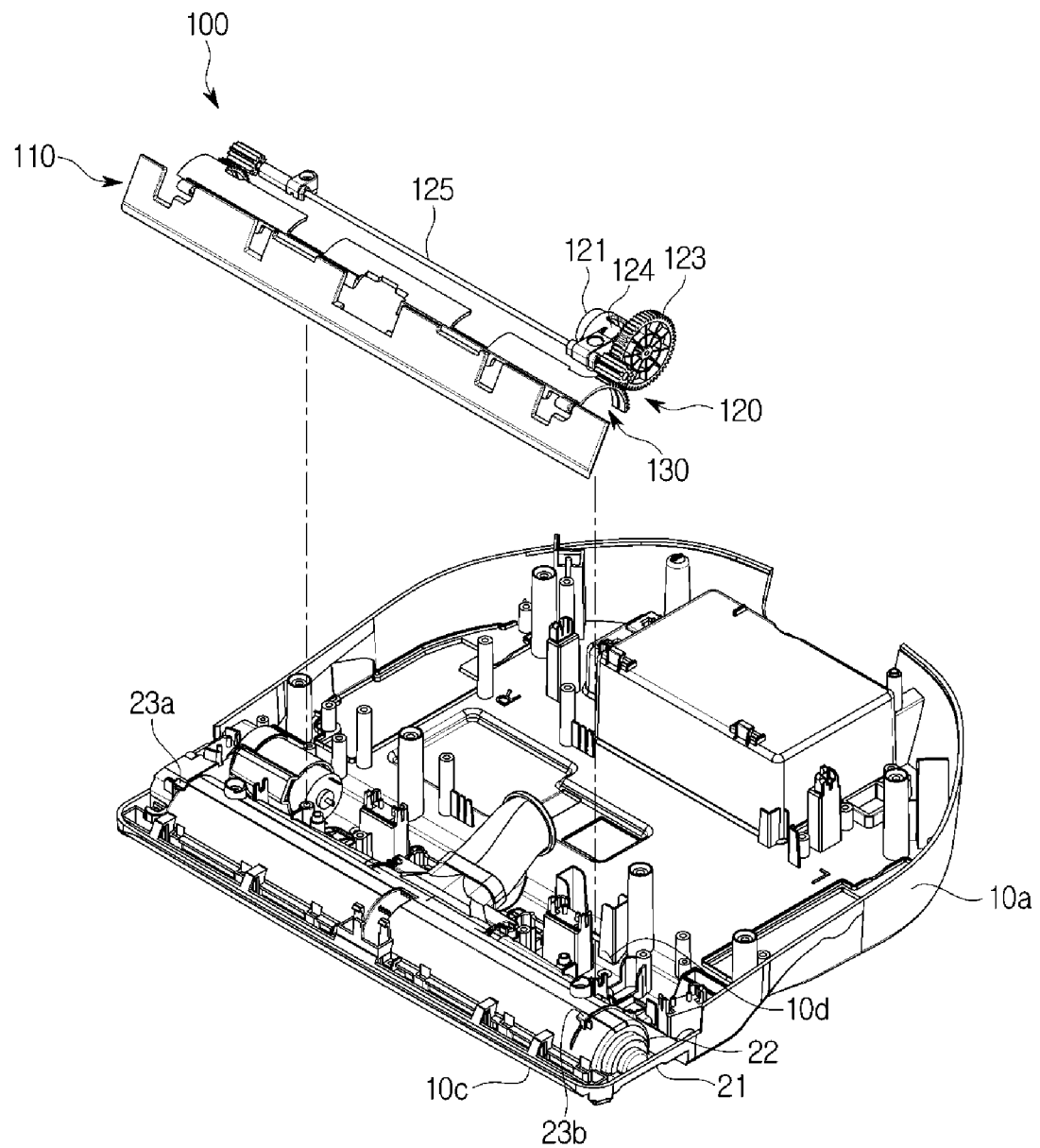
FIG. 4 shows a shutter and a shutter driver to be installed in the robot vacuum cleaner, according to the embodiment of the present disclosure.
Figure 5:
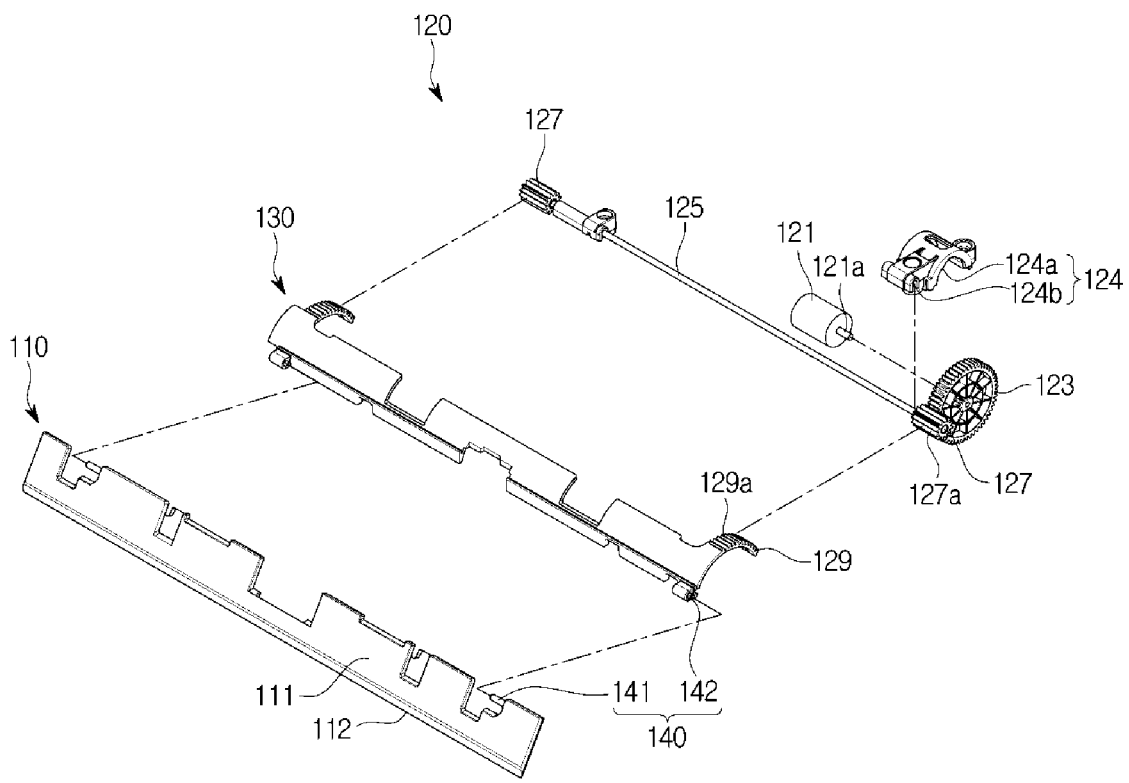
FIG. 5 is an exploded view of the shutter and the shutter driver, according to the embodiment of the present disclosure.
Figure 6:
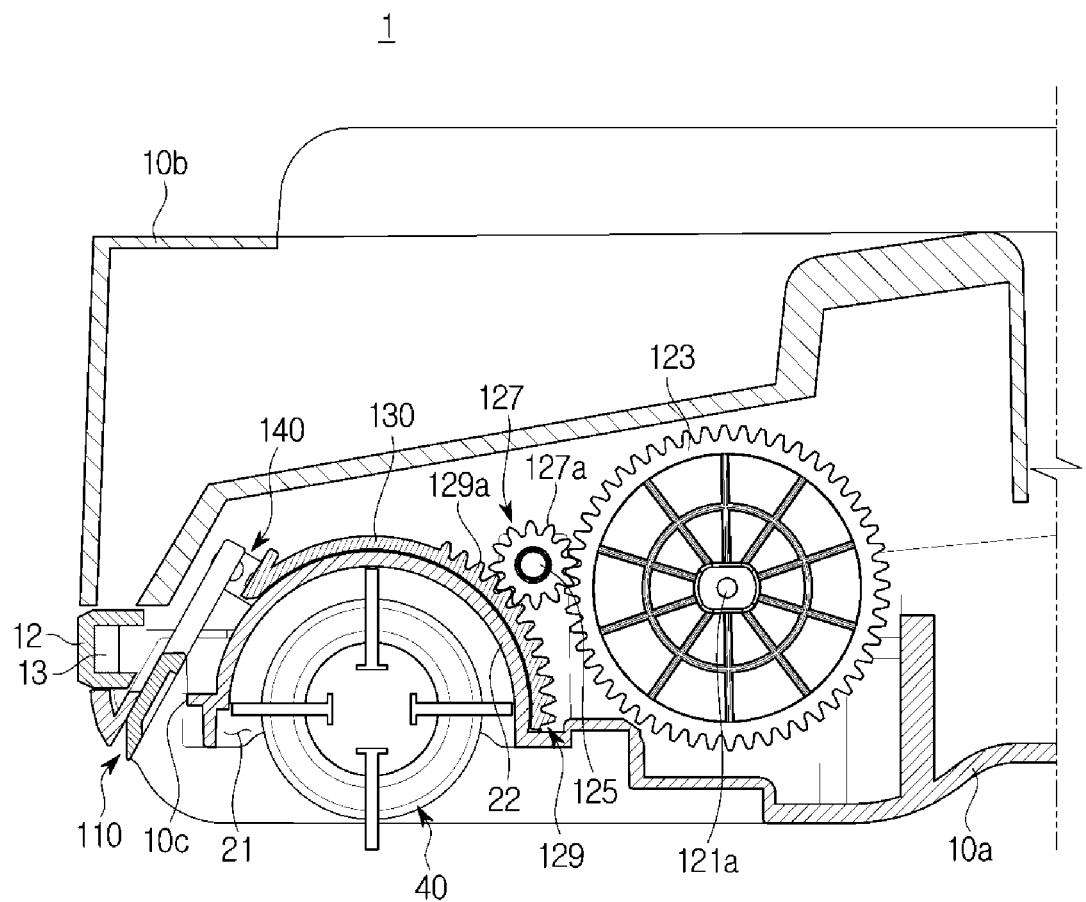
FIG. 6 is a cross-sectional view of a part of the robot vacuum cleaner with the shutter and shutter driver installed therein, according to the embodiment of the present disclosure.
Figure 7:
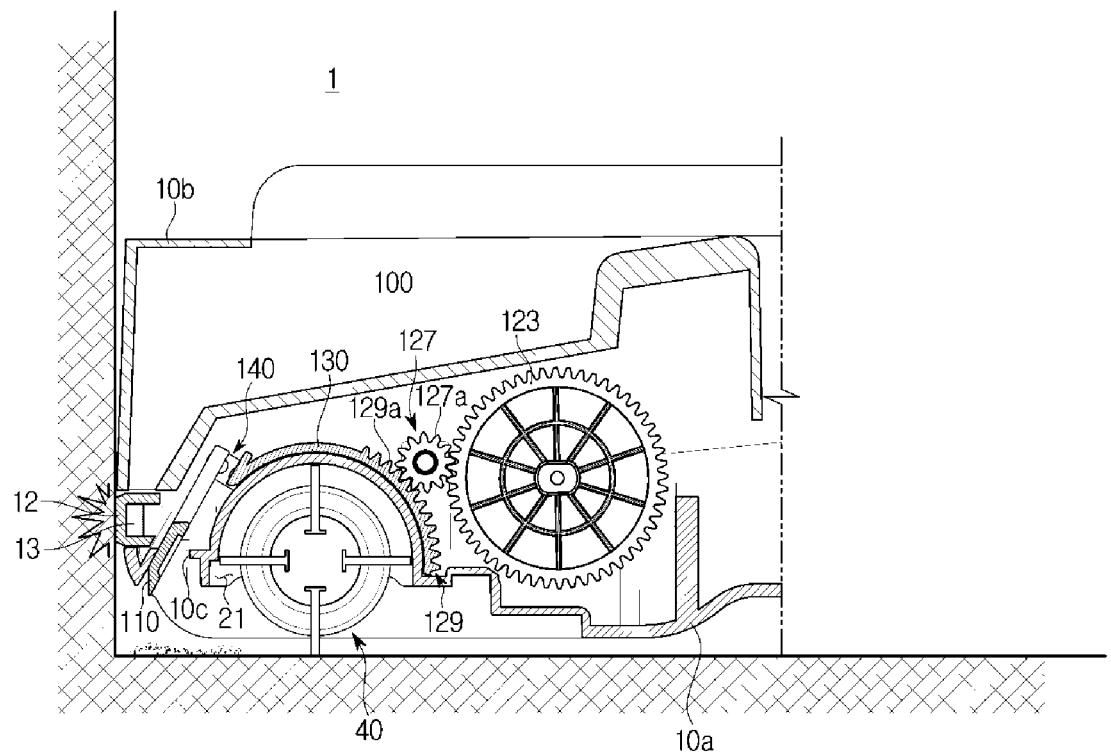
FIGS. 7, 8, 9, 10, and 11 show operations of the shutter applied for the robot vacuum cleaner, according to the embodiment of the present disclosure.
Figure 8:
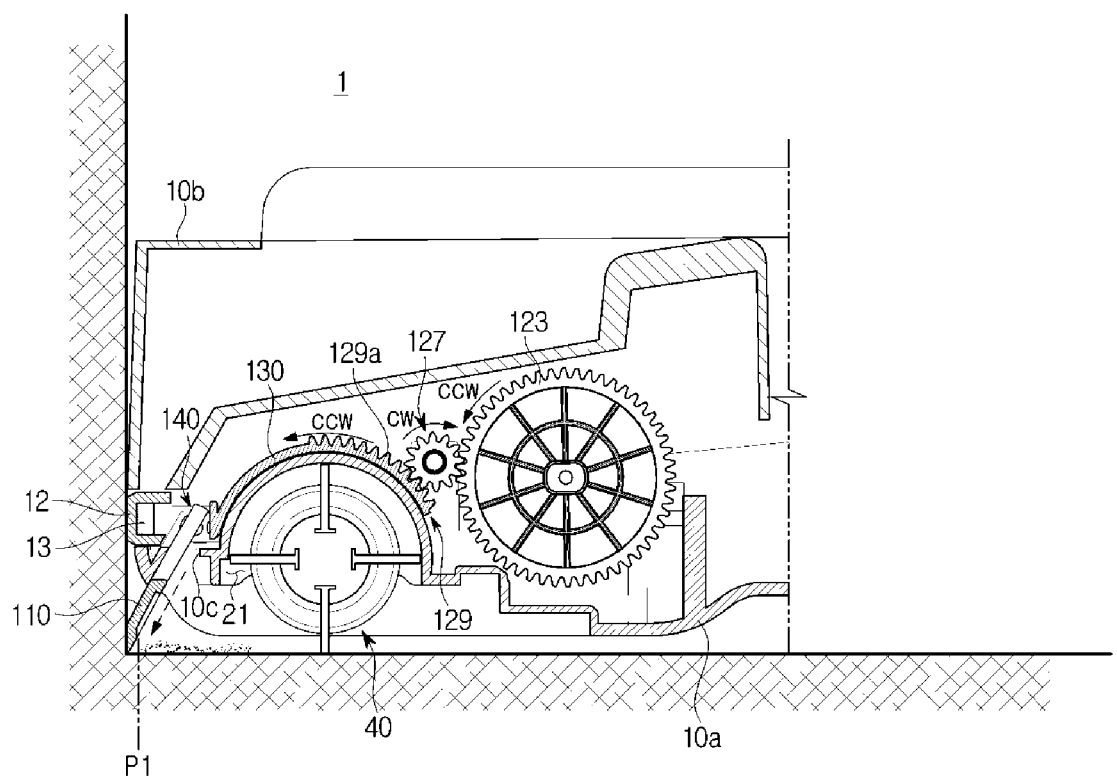
Figure 9:
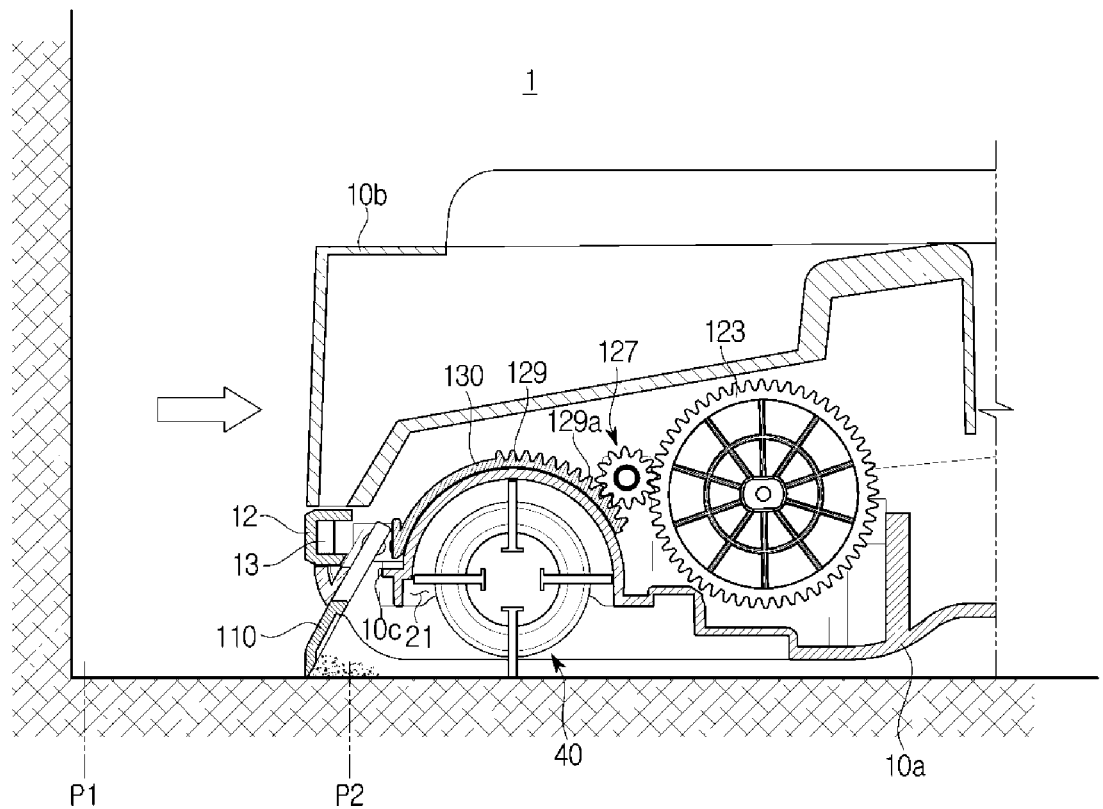
Figure 10:
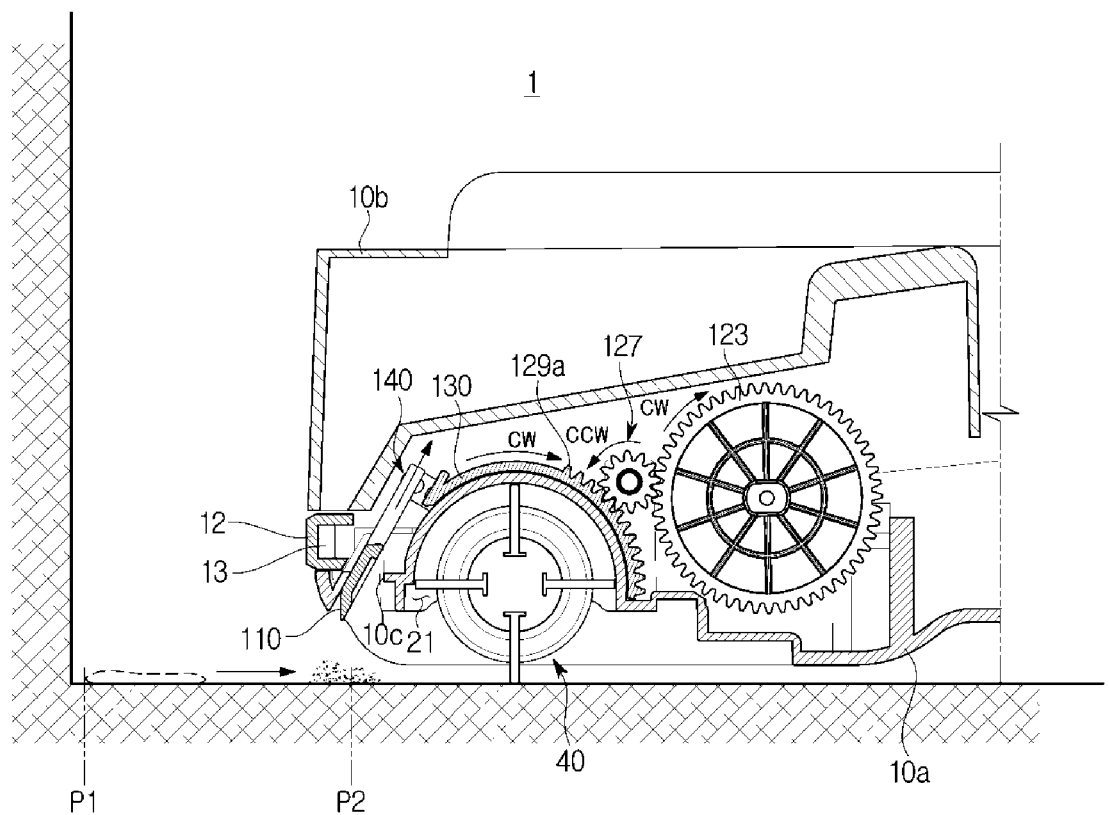

FIG. 4 shows the shutter and the shutter driver to be installed in the robot vacuum cleaner, according to the embodiment of the present disclosure, FIG. 5 is an exploded view of the shutter and the shutter driver, according to the embodiment of the present disclosure, and FIG. 6 is a cross-sectional view of a part of the robot vacuum cleaner with the shutter and shutter driver installed therein, according to the embodiment of the present disclosure.

As shown in FIGS. 4 to 6, the shutter assembly 100 to be installed in the robot vacuum cleaner 1 may include the shutter 110 and the shutter driver 120 to drive the shutter 110. The shutter 110 may be provided to be drawn out from or put into the main body 10. The shutter 110 may be installed in the suction part 20 of the main body 10. Specifically, the shutter 110 may be movably installed in the shutter install part 10*c* in front of the suction part 20, to be drawn out from or put into the main body 10.

The shutter 110 may have the form of a plate. The shutter 110 may be formed of a flexible material. At least some of the lower portion of the shutter 110 may include a flexible material to be able to contact the floor. The shutter 110 may include a shutter body 111 of a plate form, and a bottom contact part 112 formed on the lower end of the shutter body 111. The bottom contact part 112 may include a flexible rubber.

The shutter driver 120 may include the motor 121. The shutter driver 120 may include a linearly moving means, such as a solenoid.

The shutter driver 120 provided to move the shutter 110 may include the motor 121 and a power transfer link 130 arranged to transfer power of the motor 121 to the shutter 110.

The shutter driver 120 may further include a driving gear 123 rotated by the motor 121 and a shaft 125 for transferring the rotational force of the motor 121 to the power transfer link 130 through the driving gear 123.

The motor 121 may be installed by a motor bracket 124 in a motor install part 10*d* of the main body 10. The motor bracket 124 may include a motor receiver 124*a* for receiving the motor 121 and a shaft receiver 124*b* for receiving the shaft 125. It is ensured that the motor bracket 124 is stably installed by supporting the motor 121 and the shaft 125 against the main body 10. The motor 121 may include a step motor. The motor 121 may include an electromagnet. The driving gear 123 is rotated while being connected to the motor shaft 121*a* of the motor 121. A first gear part 127, in which a first gear 127*a* is formed to correspond to the driving gear 123, is arranged in the shaft 125. The first gear part 127 may be arranged on either end of the shaft 125.

The shaft 125 is arranged to transfer the rotational force of the motor 121 evenly to the left and right sides of the power transfer link 130. The shaft 125 is also arranged to transfer the rotational force of the motor 121 uniformly to the shutter 110. The shaft 125 is arranged to prevent left and right warping of the shutter 110.

Although the embodiment of the present disclosure shows the shaft 125 having the gear part 127 on either end and the gear part 127 has the gear 127*a* formed therein, the present disclosure is not limited thereto. For example, the shaft 125 may be formed with the gear on the whole of the shaft 125.

The first gear part 127 is formed at either end of the shaft 125, and the second gear part 129 corresponding to the first gear part 127 is formed at either end of the power transfer link 130.

The second gear part 129 formed to be interlocked with the first gear part 127 may be formed in the power transfer link 130. The second gear part 129 may include a second gear 129*a* formed to be interlocked with the first gear 127*a*. The second gear part 129 may be formed in at least a portion of the power transfer link 130.

The power transfer link 130 may have the form of a half-circle. The power transfer link 130 may be arranged between the shutter 110 and the motor 121 for transferring the power of the motor 121 to the shutter 110. The power transfer link 130 may be formed to correspond to the drum brush install part 22. The power transfer link 130 may be formed with a curved plane to be able to make a rotational shift. The second gear part 129 may be formed in at least a portion of the rear surface of the power transfer link 130.

Accordingly, the second gear part 129 of the power transfer link 130 may be coupled to the driving gear 123 through the first gear part 127. When the motor 121 is rotated, the driving gear 123 and the first and second gear parts 127 and 129 interlocked with the driving gear 123 are rotated, and the second gear part 129 is moved in the front-to-back direction. The power transfer link 130 may be moved along the top surface of the drum brush install part 22.

Anti-lift part 23 may be located in the drum brush install part 22 to guide movement of the power transfer link 130 and prevent the power transfer link 130 from being deviated and separated. The anti-lift part 23 may be arranged in the upper portion of the drum brush install part 22. The anti-lift part 23 may be arranged at either end of the drum brush install part 22. The anti-lift part 23 may include a first anti-lift part 23a provided to guide one side of the power transfer link 130 and a second anti-lift part 23b provided to guide the other side of the power transfer link 130. Each of the anti-lift parts 23a, 23b is arranged on the upper portion of an end of the power transfer link 130 for guiding the power transfer link 130 to be movable along the top surface of the drum brush install part 22.

The shutter 110 may be hinged with the power transfer link 130 to be engaged with the movement of the power transfer link 130. The shutter 110 may be rotationally connected to the power transfer link 130 via a hinge part 140. The hinge part 140 may include a first hinge part 141 formed on the shutter 110 and a second hinge part 142 formed on the power transfer link 130. The first hinge part 141 may be formed on the shutter body 111 of the shutter 110. The first hinge part 141 may include a hinge protrusion formed on a top end of the shutter body 111. The second hinge part 142 may be formed on the power transfer link 130. Specifically, the second hinge part 142 may be formed on a bottom end of the power transfer link 130. The second hinge part 142 may be formed at a position corresponding to the first hinge part 141. The second hinge part 142 may include a hinge groove corresponding to the hinge protrusion. While the first hinge part is a hinge protrusion and the second hinge part is a hinge groove in this embodiment, the present disclosure is not limited thereto. For example, the first hinge part 141 may include a hinge groove and the second hinge part 142 may include a hinge protrusion.

Accordingly, the shutter 110 may be put into or drawn out from the shutter install part 10c formed in the suction part, while being rotated at an end by the hinge part 140 when the power transfer link 130 is moved. The shutter 110 may be installed to be movable in the vertical direction from the main body 10.

In a typical driving mode of the robot vacuum cleaner 1, the shutter in the main body 10. At this time, the power transfer link 130 may have been completely moved to the back of the drum brush install part 22.

The robot vacuum cleaner 1 may include the controller 150 equipped in the main body 10. The controller 150 may control the shutter driver 120 to extend the shutter 110 from the main body 10 if the sensor 13 detects a wall or an obstacle. The controller 150 may also control the main body 10 for the shutter 110 to be moved backward while being drawn out from the main body 10 or for the shutter 110 to be moved forward while being put into the main body 10. The controller 150 may be configured to independently control the shutter driver 120 and the wheel 14 of the main body 10.

Accordingly, if the robot vacuum cleaner 1 detects a wall or an obstacle with the sensor 13 arranged on the front of the main body 10 of the robot vacuum cleaner 1 while being driven, the robot vacuum cleaner 1 may be moved to press itself against the wall or the obstacle and the shutter 110 may be driven by the shutter driver 120 to be drawn out, or extended, forward from the main body 10. The sensor 13 may include a camera, a three dimensional (3D) sensor, an image extractor, etc.

Figure 11:
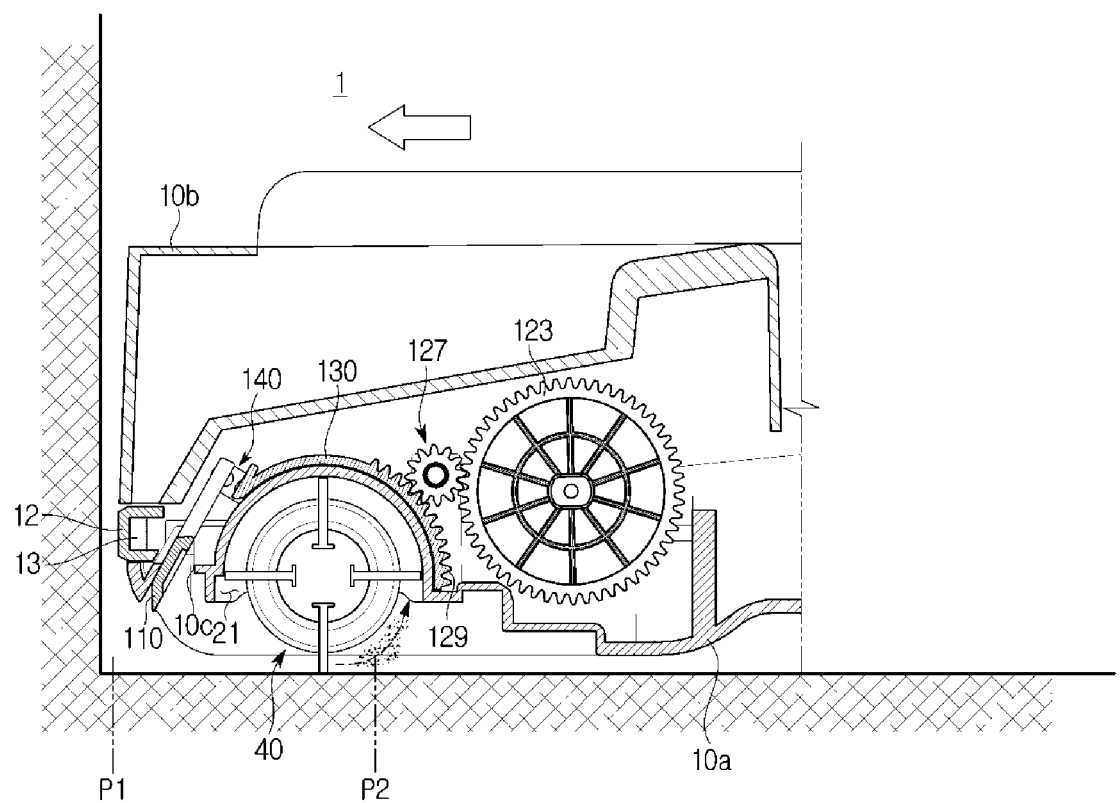
Figure 12:
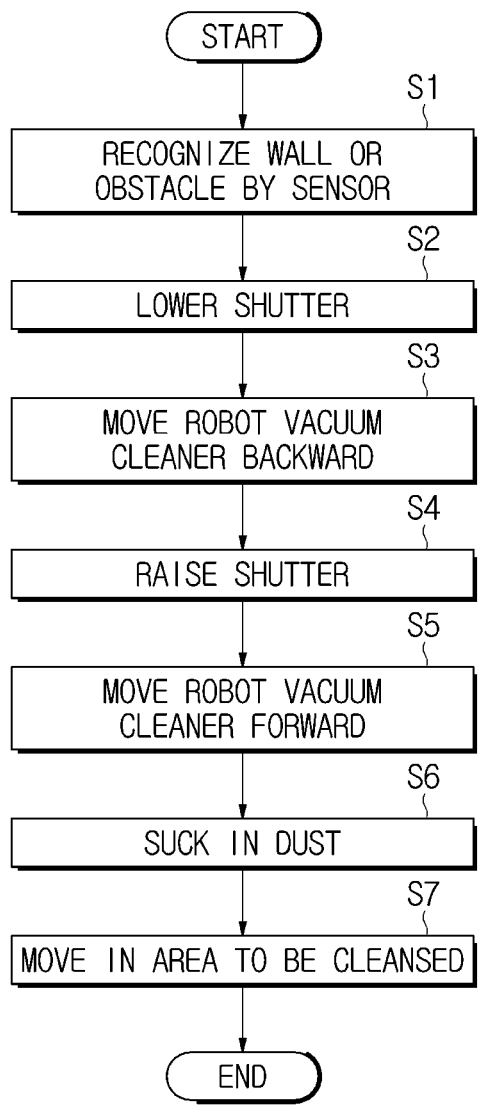
FIG. 12 is a flowchart illustrating a method for controlling the robot vacuum cleaner, according to the embodiment of the present disclosure.

FIGS. 7 to 11 show operations of the shutter applied for the robot vacuum cleaner, according to the embodiment of the present disclosure, and FIG. 12 is a flowchart illustrating a method for controlling the robot vacuum cleaner, according to the embodiment of the present disclosure.

Operation of the shutter assembly 100 applied for the robot vacuum cleaner 1 will now be described with reference to FIGS. 11 and 12.

In a typical driving mode of the robot vacuum cleaner 1, the shutter 110 remains retracted into the main body 10.

If the sensor 13 recognizes a wall when the robot vacuum cleaner 1 is moved close to the wall, the robot vacuum cleaner 1 may press itself against the wall (operation S1). In this regard, the sensor 13 installed on the bumper 12 of the robot vacuum cleaner 1 may recognize the position of the robot vacuum cleaner 1 by contacting the wall.

The robot vacuum cleaner 1 may approach the wall as close as possible by moving back and forth at least one time. At this time, the robot vacuum cleaner 1 may be moved such that the front line of the main body 10 and the wall are almost aligned with each other, because the front of the main body 10 of the robot vacuum cleaner 1 has a rectangular figure.

When the robot vacuum cleaner 1 is pressed against the wall, the controller 150 operates the shutter driver 120.

Once the motor 121 of the shutter driver 120 is operated, the driving gear 123 coupled to the motor shaft 121a is rotated in the first direction (e.g., counterclockwise, CCW) and the first gear 127a of the shaft 125 interlocked with the driving gear 123 is rotated in the second direction (e.g., clockwise, CW). The second gear 129a interlocked with the first gear 127a is rotated in the same first direction (CCW) as the driving gear 123, and accordingly, the power transfer link 130 in which the second gear 129a is formed is moved in the first direction (CCW).

The shutter 110 pivotally hinged with the power transfer link 130 is moved in the first direction (CCW) to be drawn out, lowered, or extended, from the main body 10 (operation S2).

Furthermore, the drawn-out shutter 110 may be arranged to protrude to almost the same line with the front line of the main body 10 or protrude further from the front line of the main body 10 so as to contact the adjoining edge between the wall and the floor. While the shutter 110 is drawn out from the main body 10, the controller 150 controls the robot vacuum cleaner 1 to be moved backward (operation S3).

At this time, dust and foreign materials located at a wall-adjoining point P1 are all moved backward by being swept by the shutter 110 of the robot vacuum cleaner 1. The dust and foreign materials at the wall-adjoining point P1 are all moved to a cleanable point P2 by the robot vacuum cleaner 1.

The robot vacuum cleaner 1 may be moved a predetermined distance back from the wall. If the position of the robot vacuum cleaner 1 is shifted, the controller 150 rotates the motor 121 of the shutter driver 120 in the second direction (CW) and rotates and shifts the driving gear 123 and the power transfer link 130 in the second direction (CW), and accordingly, the shutter 110 is moved in the second direction (CW) to be raised, retracted, or put into the main body 10 (operation S4).

When the shutter 110 is put into the main body 10, the controller 150 controls the robot vacuum cleaner 1 to move forward (operation S5).

If the suction part 20 of the robot vacuum cleaner 1 is moved to the cleanable point P2, the robot vacuum cleaner 1 performs cleaning by sucking in dust and foreign materials moved from the wall-adjoining point P1 to the cleanable point P2 (operation S6).

As mentioned above, by repeating the shutter 10 based operation of the robot vacuum cleaner 1, dust and foreign materials at the wall-adjoining point P1 may be efficiently cleaned. After cleaning the dust and foreign materials at the wall-adjoining point P1, the robot vacuum cleaner 1 is moved to another area to perform cleaning (operation S7).

Although the embodiment of the present disclosure shows the shutter 110 operating at the wall-adjoining point P1, the present disclosure is not limited thereto. For example, even in an area adjacent to an obstacle with a predetermined length, such as a sink or a book, cleaning efficiency may also be improved.

Figure 13:
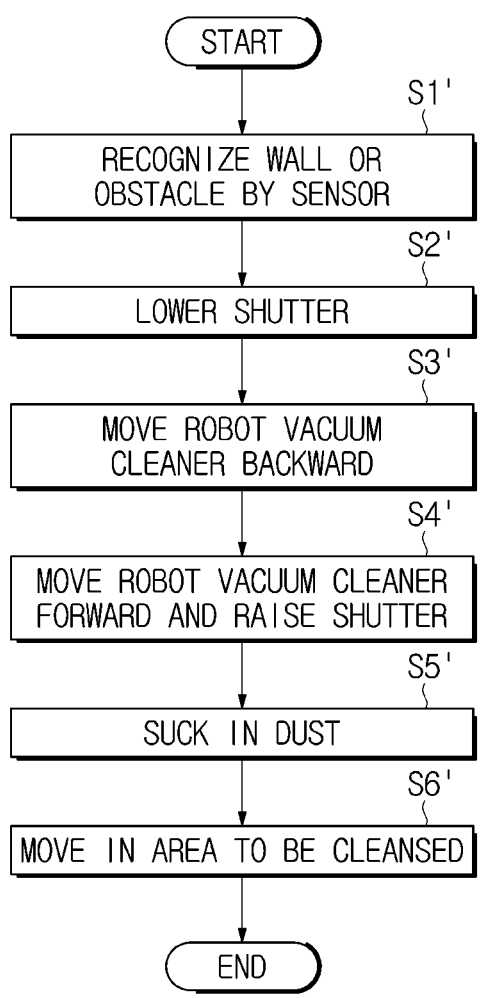
FIG. 13 is a flowchart illustrating a method for controlling the robot vacuum cleaner, according to the embodiment of the present disclosure.

FIG. 13 is a flowchart illustrating a method for controlling the robot vacuum cleaner, according to the embodiment of the present disclosure.

If the sensor 13 recognizes a wall when the robot vacuum cleaner 1 is moved close to the wall, the robot vacuum cleaner 1 may press itself against the wall (operation S1'). In this regard, the sensor 13 installed on the bumper 12 of the robot vacuum cleaner 1 may recognize the position of the robot vacuum cleaner 1 by contacting the wall.

The robot vacuum cleaner 1 may approach the wall as close as possible by moving back and forth at least one time.

When the robot vacuum cleaner 1 is pressed against the wall, the controller 150 operates the shutter driver 120.

Once the motor 121 of the shutter driver 120 is operated, the driving gear 123 coupled to the motor shaft 121$a$ is rotated in the first direction (CCW) and the first gear 127$a$ of the shaft 125 interlocked with the driving gear 123 is rotated in the second direction (CW). The second gear 129$a$ interlocked with the first gear 127$a$ is rotated in the same first direction (CCW) as the driving gear 123, and accordingly, the power transfer link 130 in which the second gear 129$a$ is formed is moved in the first direction (CCW).

The shutter 110 pivotally hinged with the power transfer link 130 is moved in the first direction (CCW) to be drawn out from the main body 10 (operation S2').

While the shutter 110 is drawn out from the main body 10, the controller 150 controls the robot vacuum cleaner 1 to move backward (operation S3').

At this time, dust and foreign materials located at a wall-adjoining point P1 are all moved backward by being swept by the shutter 110 of the robot vacuum cleaner 1. The dust and foreign materials at the wall-adjoining point P1 are all moved to a cleanable point P2 by the robot vacuum cleaner 1.

The robot vacuum cleaner 1 may be moved back from the wall. If the position of the robot vacuum cleaner 1 is moved a predetermined distance, the controller 150 moves the robot vacuum cleaner 1 forward and at the same time, rotates the motor 121 of the shutter driver 120 in the second direction (CW) and rotates and shifts the driving gear 123 and the power transfer link 130 in the second direction (CW), and accordingly, the shutter 110 is moved in the second direction (CW) to be put into the main body 10 (operation S4').

If the suction part 20 of the robot vacuum cleaner 1 is moved to the cleanable point P2, the robot vacuum cleaner 1 performs cleaning by sucking in dust and foreign materials moved from the wall-adjoining point P1 to the cleanable point P2 (operation S5').

In an example, after moving back from the wall (operation S3'), the robot vacuum cleaner 1 may move to the point P2 to suck in and clean the foreign materials, and after that, the shutter 110 may be put into the main body 10.

As mentioned above, by repeating the shutter 10 based operation of the robot vacuum cleaner 1, dust and foreign materials at the wall-adjoining point P1 may be efficiently cleaned. After cleaning the dust and foreign materials at the wall-adjoining point P1, the robot vacuum cleaner 1 is moved to another area to perform cleaning (operation S6').

Although the shutter 110 is explained as having the figure of a plate arranged lengthwise on the front, the present disclosure is not limited thereto. In an example, the shutter 110 may be arranged lengthwise on the front and flank of the main body 10. In yet an example, the shutter 110 may be arranged on a flank or on both flanks. That is, it may be arranged in the form of 'ㄴ' or 'ㄷ'. In this case, it is also possible to clean dust and foreign materials not only around the wall but also on the corner.

Figure 14:
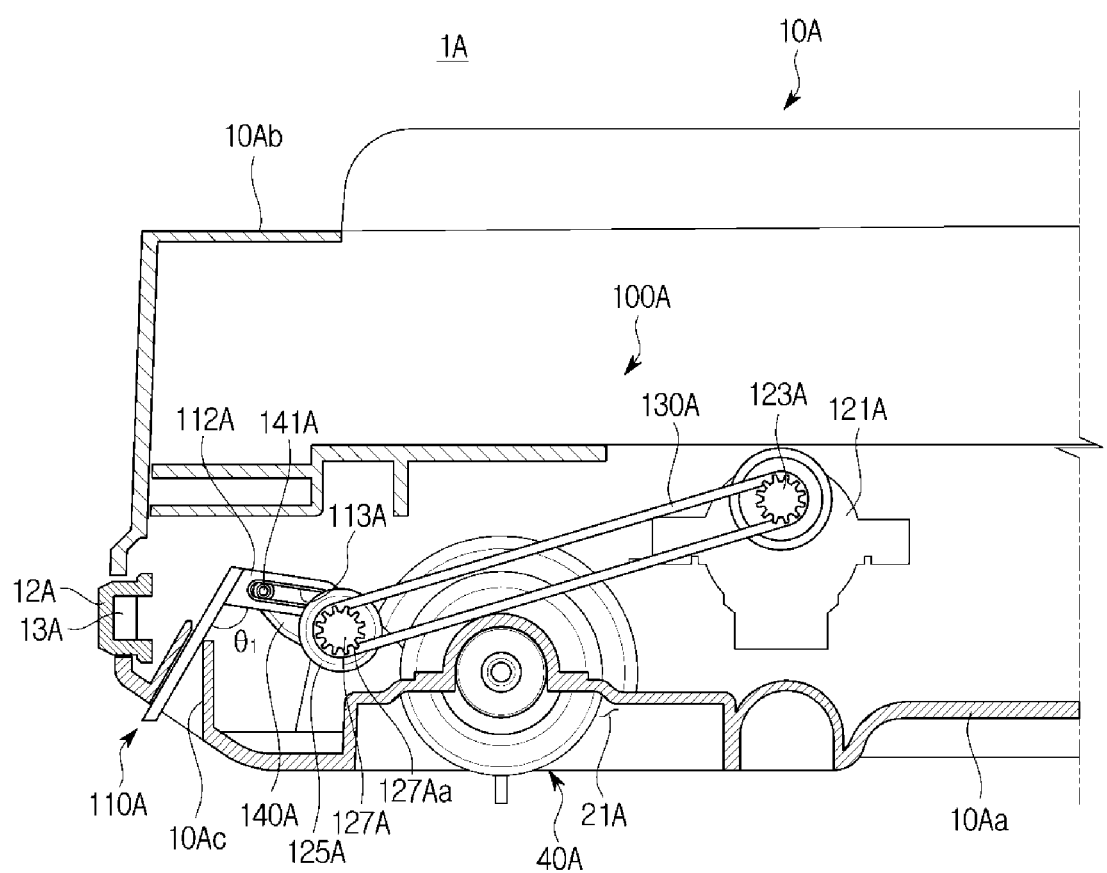
FIG. 14 shows a shutter and a shutter driver to be installed in a robot vacuum cleaner, according to an embodiment of the present disclosure.
Figure 15:
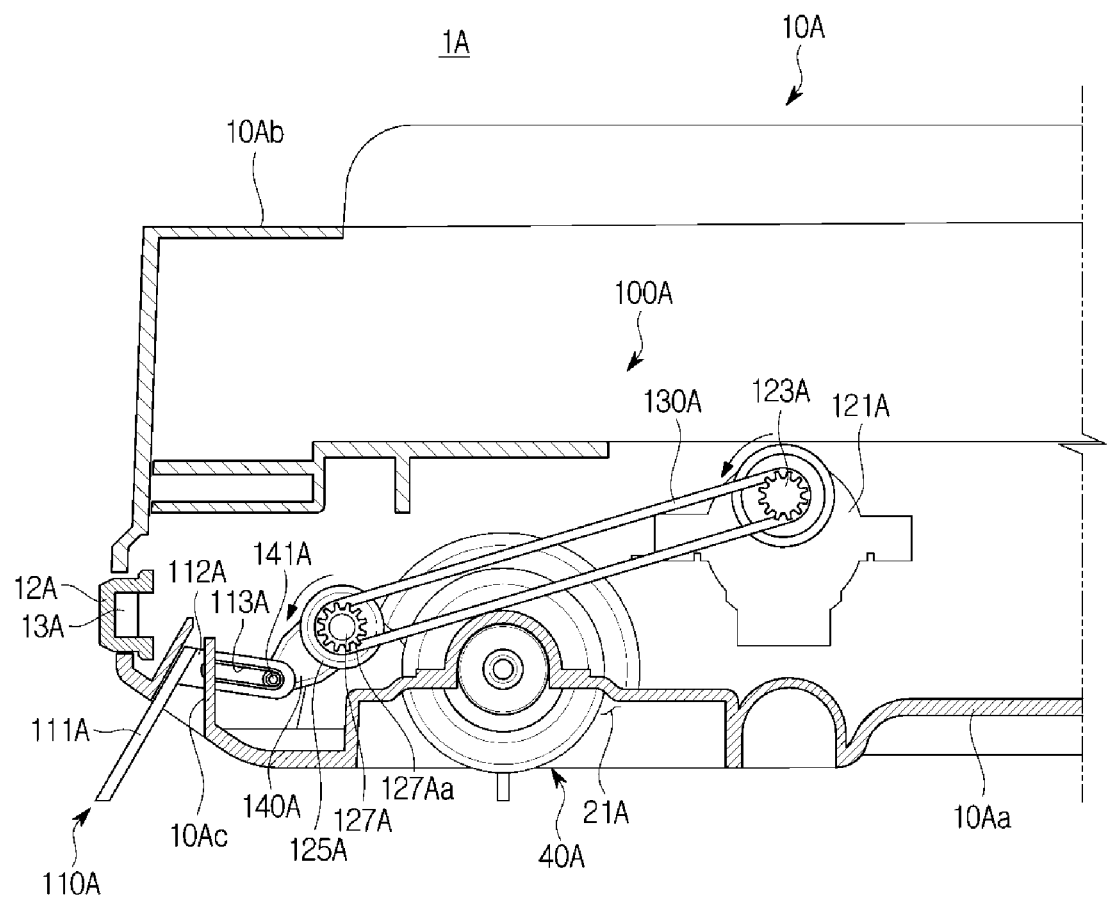
FIG. 15 shows operations of the shutter and the shutter driver in the robot vacuum cleaner, according to the embodiment of the present disclosure.

FIG. 14 shows a shutter and a shutter driver to be installed in a robot vacuum cleaner, according to an embodiment of the present disclosure, and FIG. 15 shows operations of the shutter and the shutter driver in the robot vacuum cleaner, according to the embodiment of the present disclosure. Reference numerals not shown may be referred to from FIGS. 1 to 12.

As shown in FIGS. 14 to 15, a robot vacuum cleaner 1A has a shutter assembly 100$a$ applied thereto.

The shutter assembly 100A may be installed in a main body 10A of the robot vacuum cleaner 1A. The main body 10A may include a base 10Aa and a cover 10Ab installed above the base 10Aa. There may be a bumper 12A arranged between the base 10Aa and the cover 10Ab. A sensor 13A may be mounted on the bumper 12A.

An intake 21A with a drum brush 40A installed therein may be formed in the base 10Aa.

The shutter assembly 100A may be installed in front of the intake 21A of the base 10Aa. A shutter install part 10Ac may be formed in the base 10Aa to install a shutter 110A.

The shutter assembly 100A may include the shutter 110A, a motor 121A to supply power for the shutter 110A to be movable, and a timing belt 130A provided to transfer the power of the motor 121A to the shutter 110A.

The timing belt 130A is provided to transfer a rotational force of the motor 121A to the shutter 110A. One end of the timing belt 130A is coupled to a driving gear 123A connected to the motor 121A. The other end of the timing belt 130A is coupled to a first gear part 127A having a first gear 127Aa formed therein. The first gear part 127A may be formed at an end of the shaft 125A.

A connection link 140A may be connected to the first gear part 127A. The connection link 140A may be provided to connect between the shutter 110A and the shaft 125A. The connection link 140A may be connected to the shaft 125A, i.e., the first gear part 127A at one end, and to the shutter 110A at the other end. A moving shaft 141A is formed at the other end of the connection link 140A. The moving shaft 141A may be connected to the shutter 110A to be engaged with the shutter 110A when the connection link 140A is rotated.

The shutter 110A may include a shutter body 111A of a plate form, and a shutter bracket 112A formed by extending from the top end of the shutter body 111A. The shutter body 111A may be formed to incline at a first angle $\theta 1$ from the shutter bracket 112A. The first angle $\theta 1$ may include an obtuse angle.

A moving slit 113A may be formed on the shutter bracket 112A to be combined with the moving shaft 141A of the connection link 140A.

The moving slit 113A may be formed lengthwise in the back-to-forth direction of the shutter bracket 112A. The moving slit 113A may have the form of a long hole.

The shaft 125A is configured to transfer the rotational force of the motor 121A evenly to the left and right sides of the shutter 110A. The shaft 125A is formed to prevent left and right warping of the shutter 110A. Although not shown, the connection link 140A may be formed on either end of the shaft 125A, and the moving slit 113A of the shutter 110A may be formed to correspond to the connection link 140A.

Accordingly, when the motor 121A is rotated, the driving gear 123A and the first gear part 127A, the shaft 125A, and the connection link 140A may be rotated together by the timing belt 130A.

The shutter 110A connected to the moving shaft 141A of the connection link 140A may be moved through the moving slit 113A with the movement of the moving shaft 141A, thereby being put into or drawn out from the main body 10A, the shutter install part 10Ac in particular.

The structure and operation of the robot vacuum cleaner 1A with the shutter assembly 100A as described above may be fully anticipated from the above description, so the overlapping description will be omitted.

Figure 16:
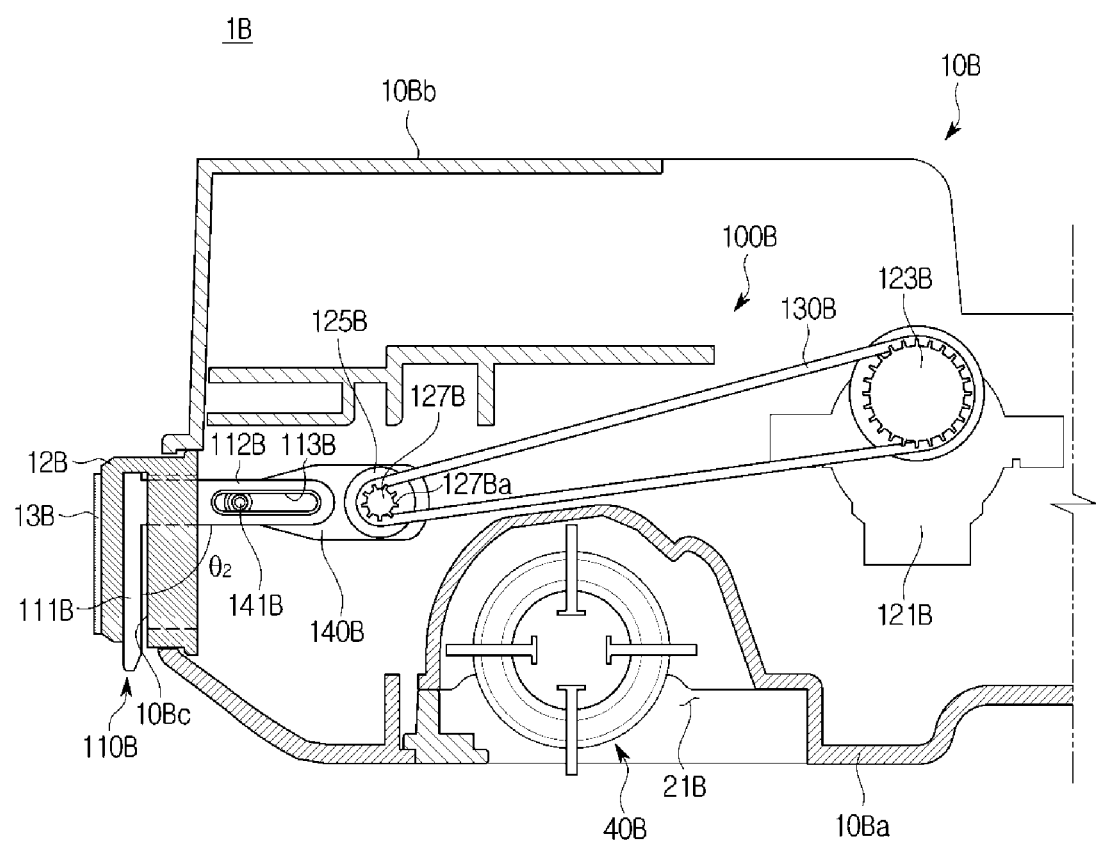
FIG. 16 shows a shutter and a shutter driver to be installed in a robot vacuum cleaner, according to an embodiment of the present disclosure.
Figure 17:
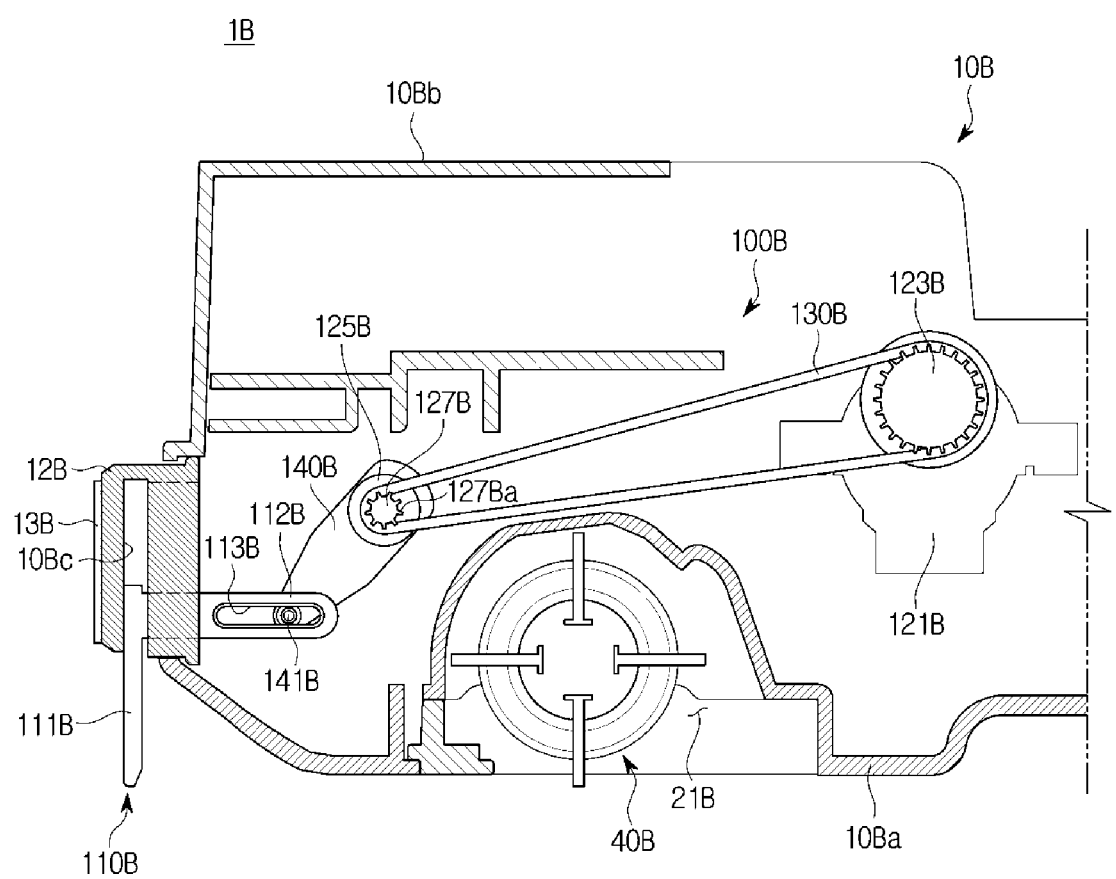
FIG. 17 shows operations of the shutter and the shutter driver in the robot vacuum cleaner, according to the embodiment of the present disclosure.

FIG. 16 shows a shutter and a shutter driver to be installed in a robot vacuum cleaner, according to an embodiment of the present disclosure, and FIG. 17 shows operations of the shutter and the shutter driver in the robot vacuum cleaner, according to the embodiment of the present disclosure. Reference numerals not shown may be referred to from FIGS. 1 to 12.

As shown in FIGS. 16 and 17, a robot vacuum cleaner 1B is shown with a shutter assembly 100B installed therein.

The shutter assembly 100B may be installed in a main body 10B of the robot vacuum cleaner 1B. A main body 10B may include a base 10Ba and a cover 10Bb. There may be a bumper 12B arranged between the base 10Ba and the cover 10Bb. A sensor 13B may be mounted on the bumper 12B. The sensor 13B may be mounted on one of the inner and outer sides of the bumper 12B depending on the type.

An intake 21B with a drum brush 40B installed therein may be formed on the bottom face of the base 10Ba.

The shutter assembly 100B may be installed adjacent to an intake 21B of the base 10Ba. A shutter 110B may be installed to be put into or drawn out from the bumper 12B. A shutter install part 10Bc may be formed in the bumper 12B to install the shutter 110B. A shutter install part 10Bc may be formed inside the bumper 12B to be bored for the shutter 110B to be put into or drawn out from the shutter install part 10Bc.

The shutter assembly 100B may include the shutter 110B, a motor 121B to supply power for the shutter 110B to be movable, and a timing belt 130B provided to transfer the power of the motor 121B to the shutter 110B.

The timing belt 130B is arranged to transfer the rotational force of the motor 121B to the shutter 110B. One end of the timing belt 130B is coupled to a driving gear 123B connected to the motor 121B. The other end of the timing belt 130B is coupled to a first gear part 127B having a first gear 127Ba formed therein. The first gear part 127B may be formed at an end of the shaft 125B.

A connection link 140B may be connected to the first gear part 127B. The connection link 140B may be provided to connect between the shutter 110B and the shaft 125B. A moving shaft 141B is formed in the connection link 140B. The moving shaft 141B may be connected to the shutter 110B such that the shutter 110B may be movable when the connection link 140B is rotated.

The shutter 110B may include a shutter body 111B of a plate form, and a shutter bracket 112B formed by extending from the top end of the shutter body 111B. The shutter body 111B may be formed to incline at a second angle $\theta 2$ from the shutter bracket 112B. The second angle $\theta 2$ may include a right angle.

A moving slit 113B may be formed on the shutter bracket 112B formed for the moving shaft 141B of the connection link 140B to be movably combined therewith. The moving slit 113B may be formed lengthwise in the back-to-forth direction of the shutter bracket 112B. The moving slit 113B may have the form of a long hole.

Although not shown, the shaft 125B is arranged to transfer the rotational force of the motor 121B evenly to the left and right sides of the shutter 110B. The shaft 125B is arranged to prevent left and right warping of the shutter 110B.

Accordingly, when the motor is rotated, the driving gear 122B and the first gear part 127B connected by the timing belt 130B, the shaft 125B, and the connection link 140B are rotated, and the shutter 110B connected to the moving shaft 141B of the connection link 140B is moved vertically with the movement of the moving shaft 141B. That is, the shutter 110B may be put into or drawn out from the main body 10B, i.e., from the shutter install part 10Bc of the bumper 12B.

The structure and operation of the robot vacuum cleaner 1B with the shutter assembly 100B as described above may be fully anticipated from the above description, so the overlapping description will be omitted.

Figure 18:
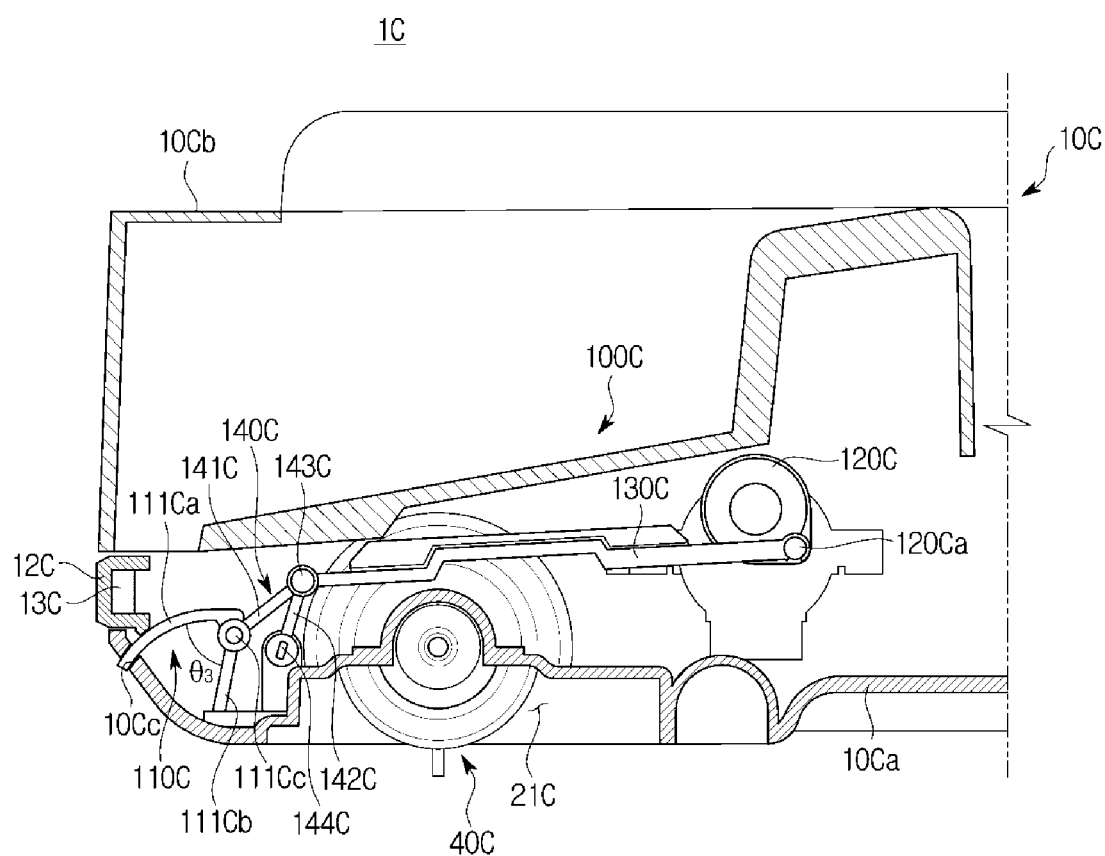
FIG. 18 shows a shutter and a shutter driver to be installed in a robot vacuum cleaner, according to an embodiment of the present disclosure.
Figure 19:
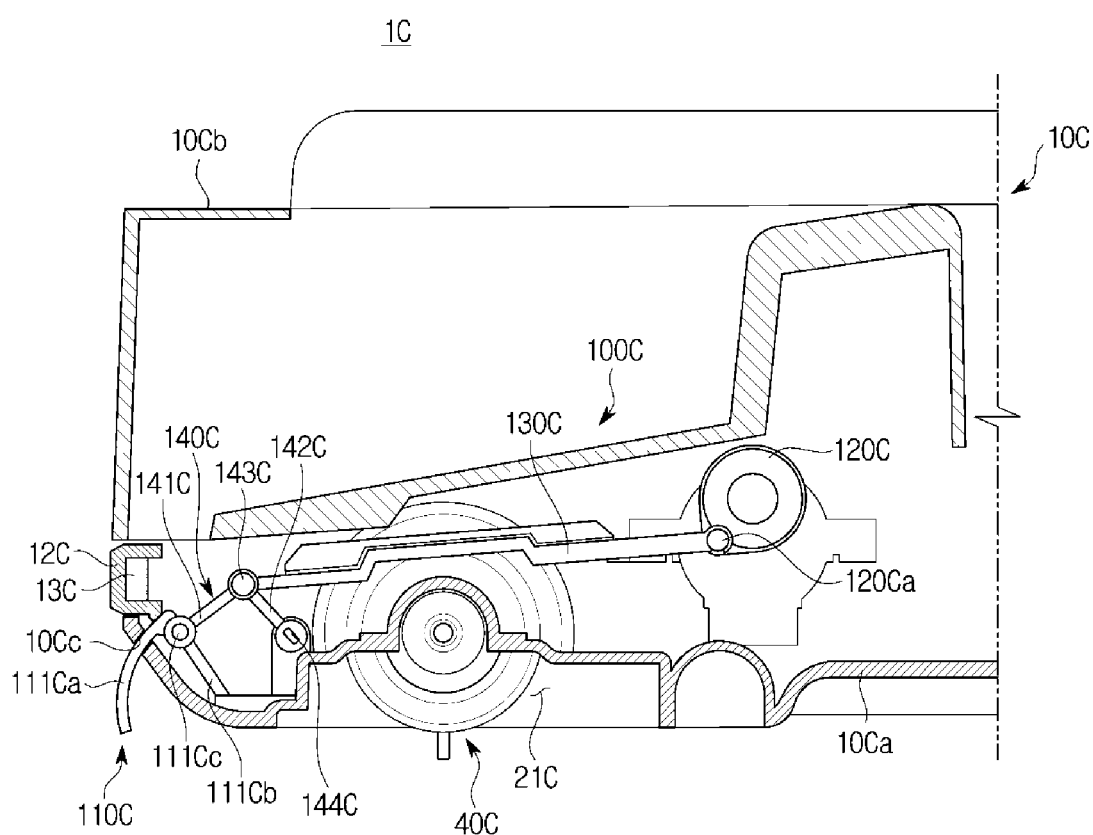
FIG. 19 shows operations of the shutter and the shutter driver in the robot vacuum cleaner, according to the embodiment of the present disclosure.

FIG. 18 shows a shutter and a shutter driver to be installed in a robot vacuum cleaner, according to an embodiment of the present disclosure, and FIG. 19 shows operations of the shutter and the shutter driver in the robot vacuum cleaner, according to the embodiment of the present disclosure. Reference numerals not shown may be referred to from FIGS. 1 to 12.

As shown in FIGS. 18 to 19, a robot vacuum cleaner 10 has a shutter assembly 100C applied thereto.

The shutter assembly 100C may be installed in a main body 100 of the robot vacuum cleaner 10. The main body 100 may include a base 100a and a cover 100b installed above the base 100a. There may be a bumper 12C arranged between the base 100a and the cover 100b. A sensor 13C may be mounted on the bumper 12C.

An intake 21C with a drum brush 40C installed therein may be formed in the base 10Ca.

The shutter assembly 100C may be installed in front of the intake 21C of the base 10Ca. A shutter install part 10Cc may be formed in the base 10Ca to install a shutter 110C. The shutter install part 10Cc may be formed on the front of the base 10Ca.

The shutter assembly 100C may include the shutter 110C, a motor 120C to supply power for the shutter 110C to be movable, and a power transfer link 130C provided to transfer the power of the motor 120C to the shutter 110C. The power transfer link 130C is arranged to transfer the rotational force of the motor 120C to the shutter 110C.

The motor 120C may include a step motor. The motor 120C may include a motor shaft 120Ca that moves a predetermined angle.

One end of the power transfer link 130C may be connected to the motor shaft 120Ca of the motor 120C. The other end of the power transfer link 130C may be connected to a connection link 140C.

The connection link 140C may be arranged to connect between the power transfer link 130C and the shutter 110C. The connection link 140C may receive power from the power transfer link 130C to make the shutter 110C pivot.

The connection link 140C may include first and second links 141C and 142C, a rotating connector 143C rotationally connecting the first and second links 141C and 142C, and a fixer 144C arranged to fix the second link 142C to the base 10Ca.

The rotating connector 143C of the connection link 140C may be connected to the power transfer link 130C that moves when receiving the power of the motor 120C, and may be moved along with the movement of the power transfer link 130C.

The shutter 110C may be moved along with the movement of the first link 141C of the connection link 140C and the rotating connector 143C.

The second link 142C connected to the rotating connector 143C is fixed to the fixer 144C.

The shutter 110C may include a first body 111Ca formed with a curved plane, and a second body 111Cb extending a third angle θ3 from the first body 111Ca. The first and second bodies 111Ca and 111Cb may have the form of a triangle. The shutter 110C may be coupled to the first link 141C by a hinge part 111Cc. The shutter 110C may be rotationally coupled to the first link 141C.

Accordingly, when the motor 120C is rotated, the power transfer link 130C connected to the motor shaft 120Ca is moved, the connection link 140C connected to the power transfer link 130C is rotated or moved with the movement of the power transfer link 130C, and the shutter 110C connected thereto is rotationally moved along with the connection link 140C.

The shutter 110C may be drawn out from or put into the shutter install part 10Cc of the base 100a by being rotated and moved.

The structure and operation of the robot vacuum cleaner 10 with the shutter assembly 100C as described above may be fully anticipated from the above description, so the overlapping description will be omitted.

Figure 20:
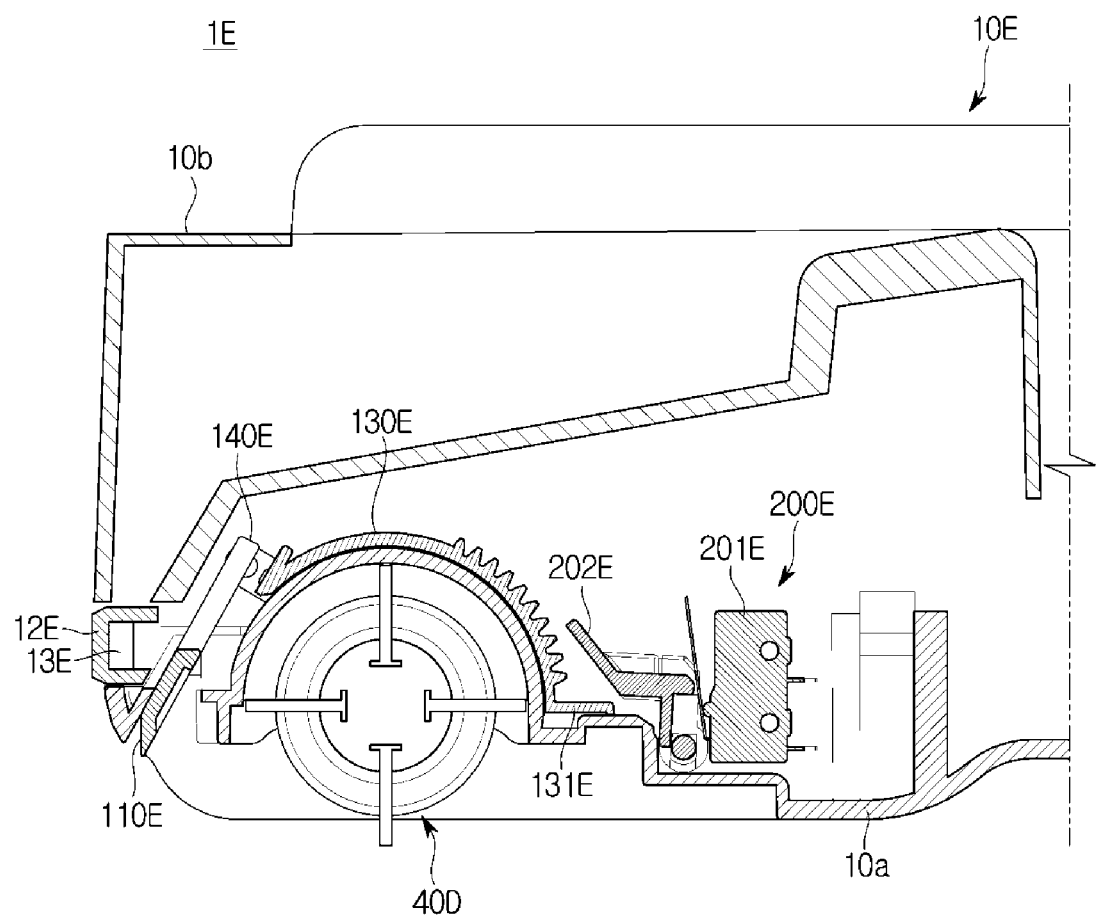
FIGS. 20 and 21 show operations of a shutter and a switch, according to an embodiment of the present disclosure.
Figure 21:
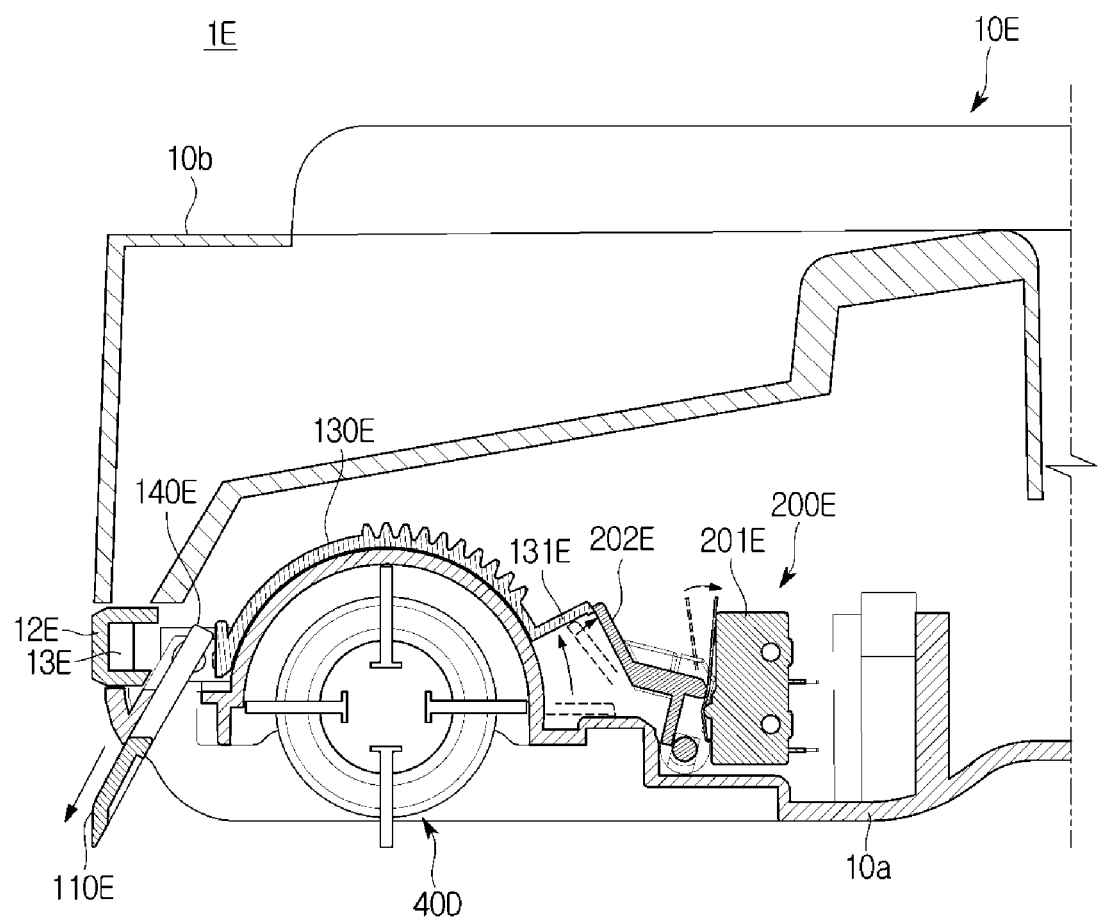

FIGS. 20 and 21 show operations of a shutter and a switch, according to an embodiment of the present disclosure. Reference numerals not shown may be referred to from FIGS. 1 to 12.

As shown in FIGS. 20 and 21, a shutter 110E of a robot vacuum cleaner 1E is arranged to be put into or drawn out from the main body 10E. There may be a bumper 12E arranged between a base 10a and a cover 10b of the main body 10E. A sensor 13E may be mounted on the bumper 12E, and the robot vacuum cleaner 1E may include a drum brush 40D.

A power transfer link 130E arranged to move the shutter 110E may be connected to a shutter driver (not shown). The shutter 110E may be hinged with a power transfer link 130E to be engaged with the movement of the power transfer link 130E. The shutter 110E may be rotationally connected to the power transfer link 130E via a hinge part 140E.

A switch 200E may be included to detect the movement of the shutter 110E. The switch 200E may be placed in the base 10a of the main body 10E. The switch 200E may include a main body 202E and a button part 201E. The button part 201E may be rotationally mounted on the main body 202E.

The power transfer link 130E may include a pressurizer 131E to press the shutter 200E. The pressurizer 131E of the power transfer link 130E may press the button part 201E of the switch 200E by being engaged with the movement of the shutter 110E.

The shutter 110E is put into the main body 10E while the robot vacuum cleaner 1E is driven for cleaning. At this time, the button part 201E of the switch 200E is not in contact with the main body 202E.

If the robot vacuum cleaner 1E is moved close to the wall and the sensor 13E senses the wall, the shutter 110E is moved to be drawn out from the main body 10E.

The pressurizer 131E of the power transfer link 130E that moves the shutter 110E presses the button part 201E of the switch 200E to be rotated, and accordingly, the button part 201E comes into contact with the main body 202E and is able to recognize whether the shutter 110E is inserted or drawn out.

Figure 22:
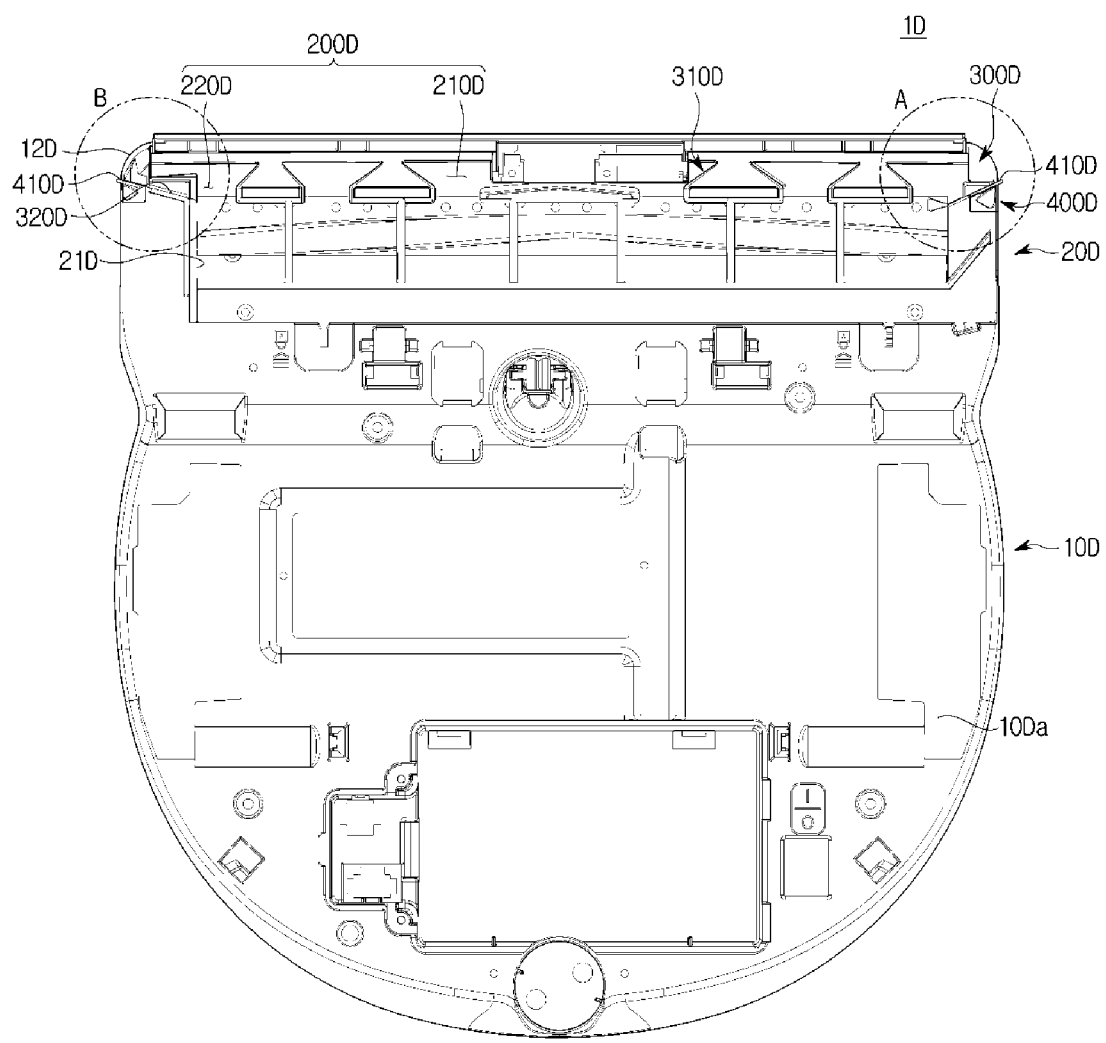
FIG. 22 is a bottom view of a robot vacuum cleaner, according to the embodiment of the present disclosure.
Figure 23:
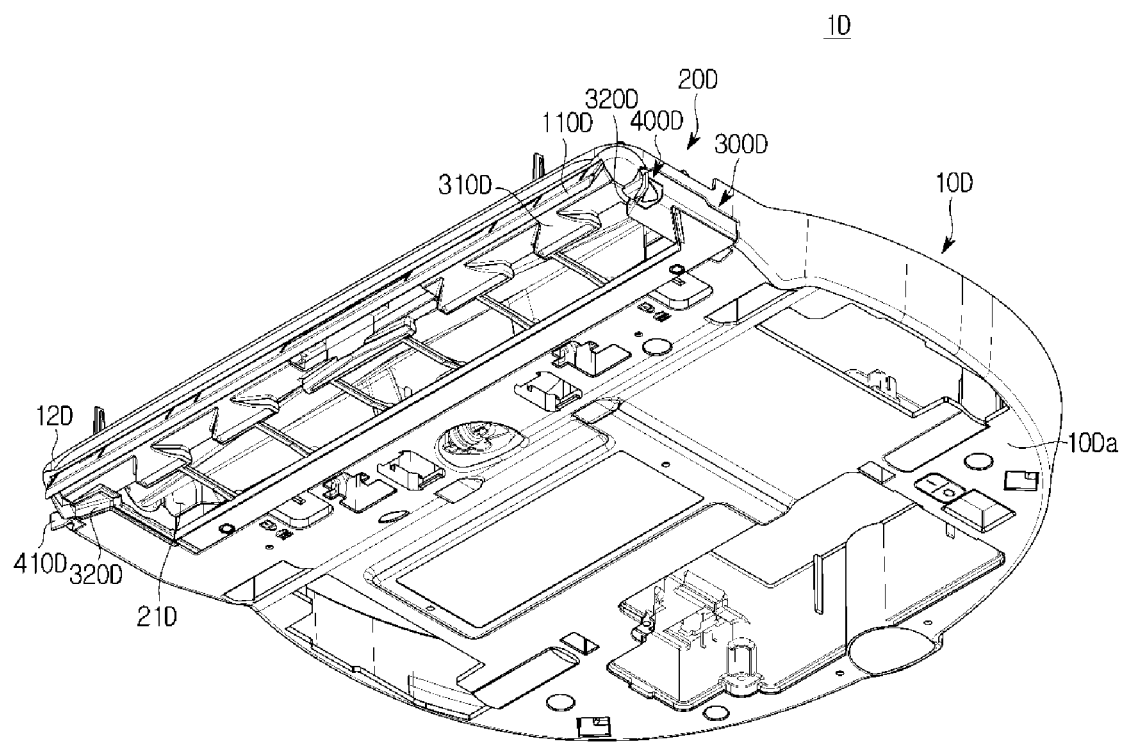
FIG. 23 is a bottom view of the robot vacuum cleaner equipped with a nozzle blade, according to the embodiment of the present disclosure.
Figure 24:
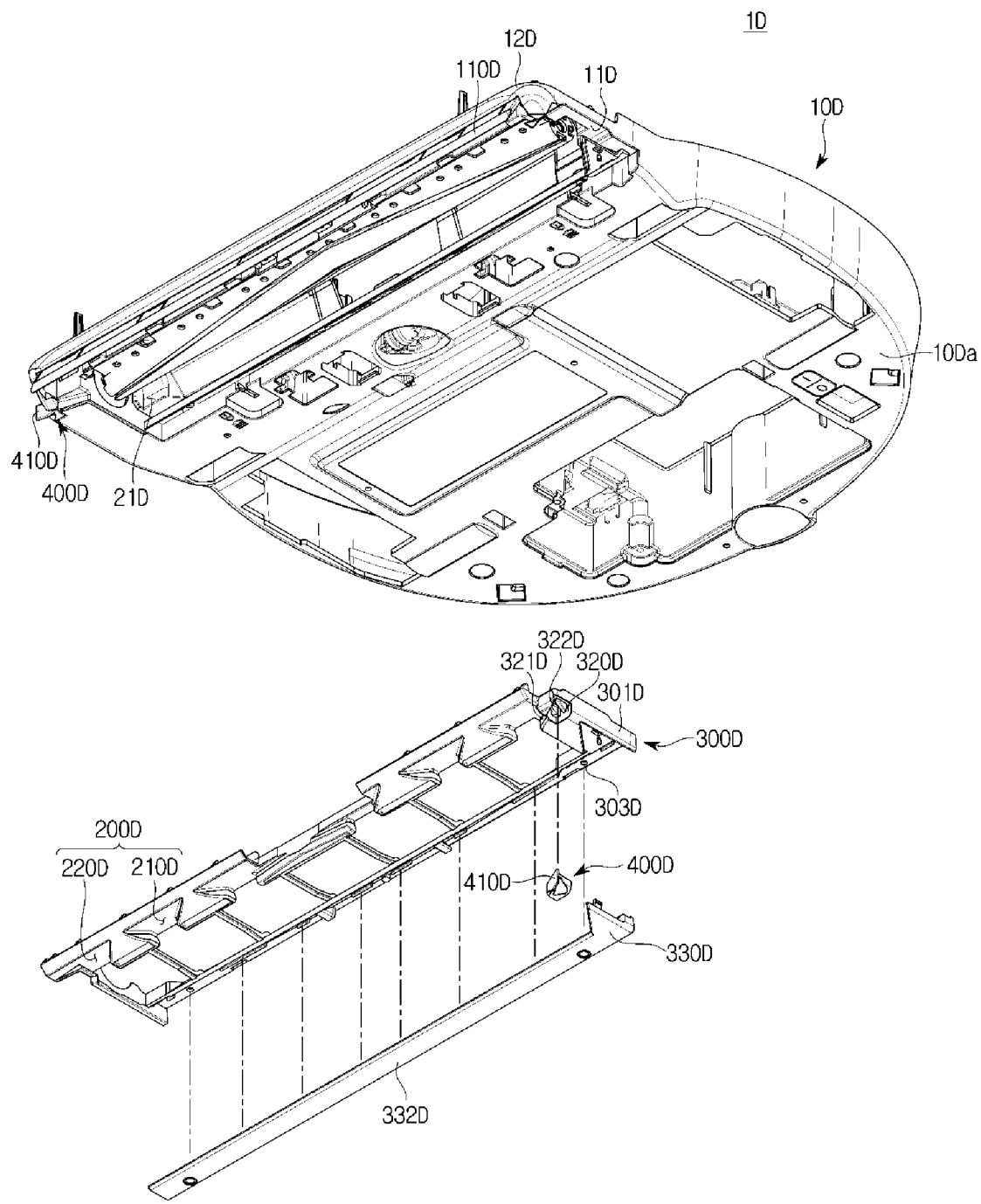
FIG. 24 is an exploded view illustrating the nozzle blade to be equipped in the robot vacuum cleaner, according to the embodiment of the present disclosure.
Figure 25:
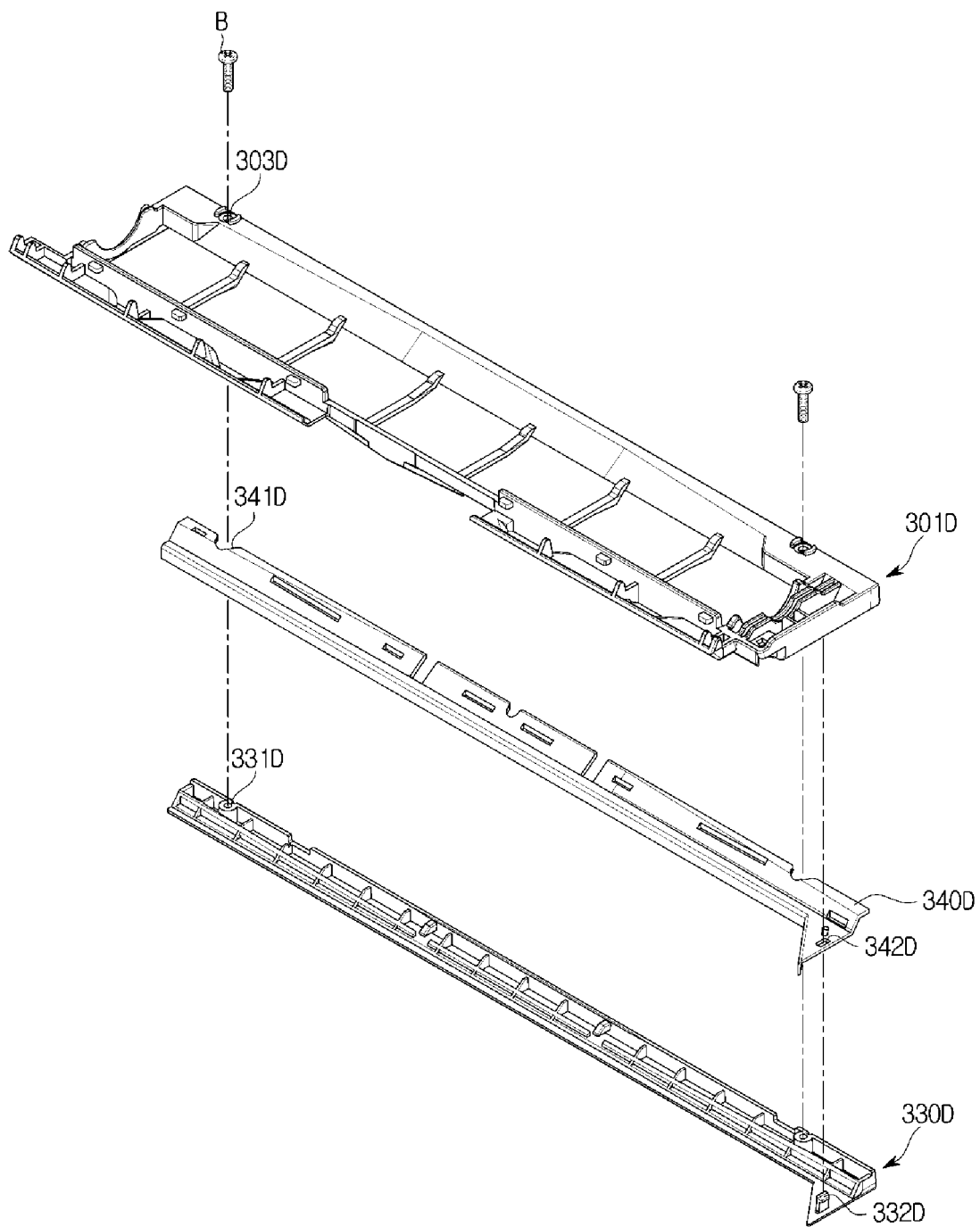
FIG. 25 is an exploded view of the nozzle blade, according to the embodiment of the present disclosure.

FIG. 22 is a bottom view of a robot vacuum cleaner, according to an embodiment of the present disclosure, FIG. 23 is a bottom view of the robot vacuum cleaner equipped with a nozzle blade, according to the embodiment of the present disclosure, FIG. 24 is an exploded view illustrating the nozzle blade to be equipped in the robot vacuum cleaner, according to the embodiment of the present disclosure, and FIG. 25 is an exploded view of the nozzle blade, according to the embodiment of the present disclosure. Reference numerals not shown may be referred to from FIGS. 1 to 12.

As shown in FIGS. 22 to 25, nozzle blades 300D may be arranged in a suction part 20D of a robot vacuum cleaner 1D, having a bumper 12D and a shutter 110D, to form a suction path 200D.

The nozzle blades 300D may be mounted in an intake 21D. The nozzle blades 300D may be detachably mounted in the intake 21D. The nozzle blades 300D may have the size and figure corresponding to the intake 21D. A nozzle blade install part 11D may be formed in the intake 21D of the main body 10D to have the nozzle blades 300D installed in the intake 21D.

The nozzle blades 300D may include a main fluid path former 310D arranged to form a first suction path 210D on the front of the suction part 20D. The nozzle blades 300D may include a flank fluid path former 320D arranged to form a second suction path 220D on the flank of the suction part 20D. The first suction path 210D may include a main fluid path. The second suction path 220D may include a flank fluid path. The first suction path 210D may be formed in the central part of the front of the nozzle blades 300D, and the second suction path 220D may be formed on either flank of the nozzle blades 300D.

The nozzle blades 300D may include a nozzle blade body 301D and a nozzle blade cover 330D. The nozzle blade body 301D is mounted on the nozzle blade install part 11D of the main body 10D to form the suction path 200D.

The nozzle blade cover 330D may be installed on the nozzle blade body 301D to fix the nozzle blades 300D. The nozzle blade cover 330D is arranged on the back of the nozzle blade body 301D to form the back of the suction path 200D formed by the nozzle blades 300D. The nozzle blade cover 330D may include an elastic substance. The nozzle blade cover 330D is arranged to stably support the nozzle blades 330D mounted on the base 10Da. The nozzle blade cover 330D arranged on the bottom face of the robot vacuum cleaner 1D may come into contact with the floor while the robot vacuum cleaner 1D is driven. Since the nozzle blade cover 330D is formed of the elastic substance, it may soften the shock to the main body 10D. The main fluid path former 310D to form the first suction path 210D and the flank fluid path former 320D to form the second suction path 220D may be arranged on the front of the nozzle blade body 301D.

The main fluid path former 310D is arranged on the front of the nozzle blade body 301D to guide the air sucked in through the intake 21D. The main fluid path former 310D may be in the plural, and arranged at predetermined intervals. The main fluid path former 310D may include a main fluid path forming area 311D formed in the central part of the front of the nozzle blade body 301D. The main fluid path forming area 311D may be formed to collect the dust and air in front of the main body 10D of the robot vacuum cleaner 1D to the intake 21D. The main fluid path forming area 311D may have the decreasing width as it approaches the back of the nozzle blade body 301D. The velocity of air flowing through the first suction path 210D between the main fluid path forming areas 311D may increase as the air proceeds adjacent to the back.

Although the main fluid path former is shaped like a triangle in this embodiment, the present disclosure is not limited thereto. It may include various shapes that may guide dust and air in the front toward the intake.

The nozzle blade body 301D may be fastened to the nozzle blade cover 330D via a coupling member 340D. The coupling member 340D may have the corresponding shape to the nozzle blade cover 330D. The coupling member 340D may guide the nozzle blade cover 330D to be mounted on the nozzle blade body 301D. The coupling member 340D may be mounted on a cover coupler 303D of the nozzle blade body 301D. An install part 341D corresponding to the cover coupler 303D is formed on the coupling member 340D. On the nozzle blade cover 330D, a fixing member coupler 331D is formed to correspond to the cover coupler 303D and the install part 341D. Accordingly, a fixing member B, such as a bolt to be put into the cover coupler 303D of the body 301D penetrates the install part 341D of the coupling member 340D and is fastened to the fixing member coupler 331D of the nozzle blade cover 330D.

The nozzle blade cover 330D may further include a hook 332D. The hook 332D penetrates a hook hole 342D of the coupling member 340D to be hooked with the nozzle blade body 301D.

The flank fluid path former 320D may be arranged on either front flank of the robot vacuum cleaner 1D. The flank fluid path former 320D may be formed in an upper part of a flank of the nozzle blade body 301D. The flank fluid path former 320D may be formed to collect the dust and air on the side of the main body 10D to the intake 21D.

Figure 26:
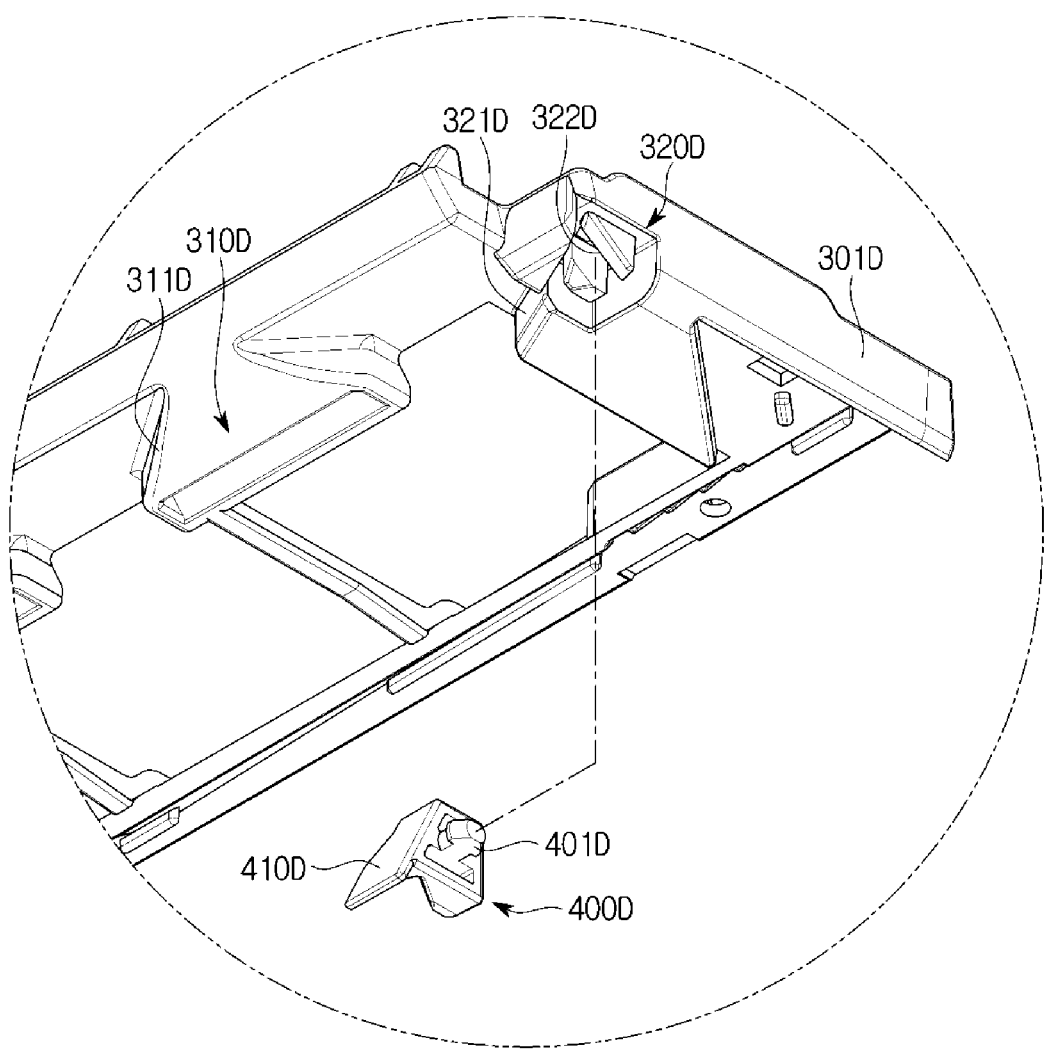
FIG. 26 shows coupling of the nozzle blade and a flank fluid path guide, according to the embodiment of the present disclosure.
Figure 27:
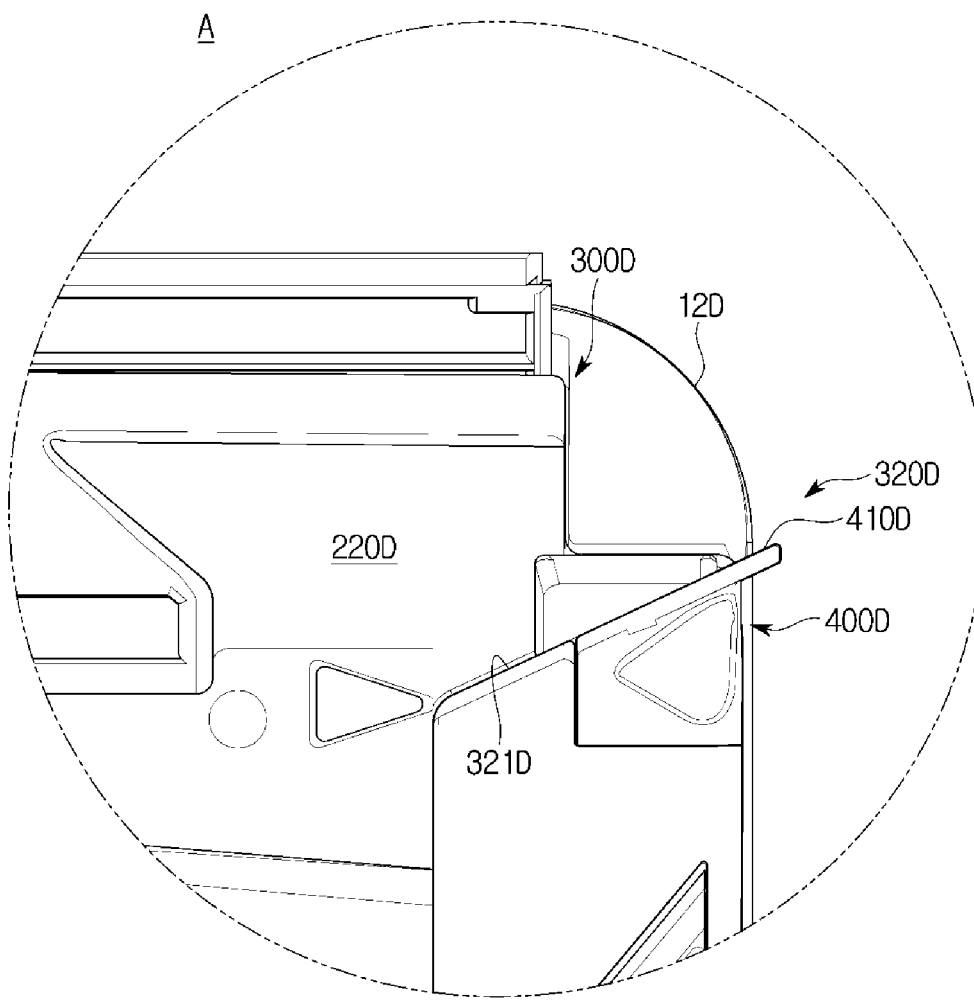
FIG. 27 is an enlarged view of part A of FIG. 22, illustrating a flank fluid path former of the nozzle blade, according to the embodiment of the present disclosure.
Figure 28:
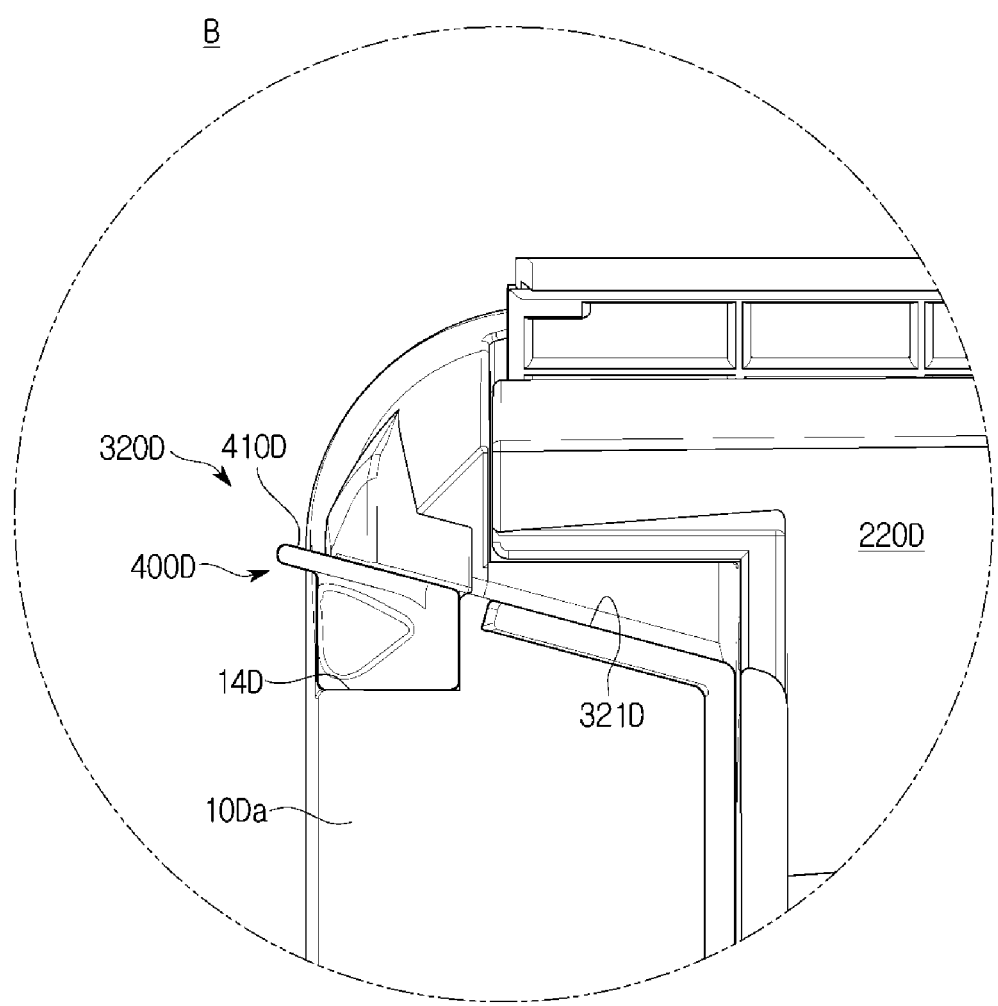
FIG. 28 is an enlarged view of part B of FIG. 22, illustrating a flank fluid path former of the nozzle blade, according to the embodiment of the present disclosure.

FIG. 26 shows coupling of the nozzle blade and a flank fluid path guide, according to the embodiment of the present disclosure, FIG. 27 is an enlarged view of part A of FIG. 22, illustrating the flank fluid path former of the nozzle blade, according to the embodiment of the present disclosure, and FIG. 28 is an enlarged view of part B of FIG. 22, illustrating a flank fluid path former of the nozzle blade, according to the embodiment of the present disclosure.

As shown in FIGS. 26 to 28, the flank fluid path former 320D may be arranged on at least one of the nozzle blade 300D and the base 10Da of the main body 10D.

The flank fluid path former 320D may be formed in an upper part of a flank of the nozzle blade body 301D. The flank fluid path former 320D may be formed to collect the dust and air on the side of the main body 10D to the intake 21D. The flank fluid path former 320D may include a flank fluid path forming area 321D and a flank fluid path blade 400D.

The flank fluid path forming area 321D may be formed in an upper part of a flank of the nozzle blade body 301D. The flank fluid path forming area 321D may be formed to have an inclination in an upper portion of the nozzle blade body 301D.

The flank fluid path blade 400D may be installed in a flank fluid path blade install part 322D formed in the nozzle blade body 301D. The flank fluid path blade install part 322D may be tilted to the side of the intake 21D to make the air flow into the second suction path 220D. The flank fluid path blade 400D may be tilted to the side of the intake 21D to make the air flow into the second suction path 220D. The flank fluid path blade 400D may include a flank fluid path blade fixer 401D formed to correspond to the flank fluid path blade install part 322D. Although the flank fluid path blade fixer 401D has the figure of a hook to be inserted and fixed to the flank fluid path blade install part 322D in this embodiment, the present disclosure is not limited thereto.

The flank fluid path blade 400D may include a flank fluid path guide 410D, which is formed of an elastic material and formed by extending from the flank fluid path blade 400D. The flank fluid path guide 410D may be formed to collinearly extend from the flank fluid path forming area 321D. The flank fluid path guide 410D may be formed to protrude outward from the main body 10D. The flank fluid path guide 410D may be formed to protrude outward from the base 10Da. The flank fluid path guide 410D formed to protrude outward from the main body 10D and the base 10Da may extend the second suction path 220D and guide the air in front, on the side, and on the corner of the main body 10D to the intake 21D.

Furthermore, the flank fluid path former 320D may be arranged in an upper part of a flank of the base 10Da of the main body 10D. The flank fluid path forming area 321D may be slantingly formed in an upper portion of a flank of the base 10Da. The flank fluid path forming area 321D is arranged to form the second suction path 220D. The flank fluid path former 320D may be arranged on the base 10Da. There may be a flank fluid path install part 14D formed on the base 10Da to have the flank fluid path blade 400D installed. The flank fluid path guide 410D may be arranged at an end of the flank fluid path blade 400D. The flank fluid path guide 410D of the flank fluid path blade 400D installed in the flank fluid path install part 14D may be formed to protrude outward from the main body 10D. The flank fluid path guide 410D installed in the flank fluid path install part 14D may be arranged to extend from the flank fluid path forming area 321D formed on the base 10Da.

The flank fluid path guide 410D of the flank fluid path blade 400D protruding outward from the main body 10D and the base 10Da may extend the second suction path 220D and guide the dust and air in front, on the side, and on the corner of the robot vacuum cleaner 1D to the intake 21D.

According to embodiments of the present disclosure, an improved structure of a robot vacuum cleaner can increase cleaning efficiency of the robot vacuum cleaner in an area adjacent to the walls or obstacles.

Furthermore, with an improved structure of a flank suction path, flank cleaning performance may be improved.

Several embodiments have been described above, but a person of ordinary skill in the art will understand and appreciate that various modifications can be made without departing the scope of the present disclosure. Thus, it will be apparent to those ordinary skilled in the art that the true scope of technical protection is only defined by the following claims.

What is claimed is:

1. A robot vacuum cleaner comprising:
a main body configured to be driven on a surface towards an obstacle by at least one wheel rotating in a first rotational direction and away from an obstacle by the at least one wheel rotating in a second rotational direction opposite to the first rotational direction, and having an intake configured to suck in debris from the surface;
a shutter installed further from a center of the robot vacuum cleaner than the intake to be positioned between the intake and the obstacle, and configured to move from a retracted position to an extended position by at least one of a rotational motion of the shutter in the first rotational direction and a linear motion of the shutter to avoid sweeping debris away from the intake during the movement of the shutter from the retracted position to an extended position, such that in the extended position, the shutter is configured to contact, by a side of the shutter facing the intake, debris on the surface outside a reachable area of the intake and to sweep the debris away from the obstacle during a driving movement of the main body away from the obstacle to position the debris inside the reachable area of the intake during a subsequent driving movement of the main body towards the obstacle;
a shutter driver configured to move the shutter between the retracted position and the extended position; and
a sensor installed in the main body and configured to detect an obstacle,
wherein the shutter is configured to extend from the main body to a position adjacent to the obstacle when the sensor detects the obstacle.

2. The robot vacuum cleaner of claim 1, further comprising: a power transfer link movably connecting the shutter driver to the shutter.

3. The robot vacuum cleaner of claim 2, further comprising: a shaft configured to transfer a rotational force from the shutter driver to the power transfer link.

4. The robot vacuum cleaner of claim 3, further comprising:
a driving gear configured to be rotated by the shutter driver;
a first gear formed on the shaft to be interlocked with the driving gear; and
a second gear configured to be interlocked with the first gear to rotate the power transfer link.

5. The robot vacuum cleaner of claim 4, wherein the second gear is located in the power transfer link.

6. The robot vacuum cleaner of claim 3, further comprising: a connection link connecting the shutter to the shaft, wherein the connection link is rotatably connected to the shutter.

7. The robot vacuum cleaner of claim 2, wherein the shutter is provided on a hinge.

8. The robot vacuum cleaner of claim 2, wherein the power transfer link comprises
a timing belt configured to connect the shutter driver to the shutter.

9. The robot vacuum cleaner of claim 2, further comprising: an anti-lifter configured to guide the power transfer link.

10. The robot vacuum cleaner of claim 1, further comprising: a controller installed in the main body,
wherein the controller is configured to drive the main body away from the obstacle with the shutter extended from the main body and then move the main body toward the obstacle with the shutter retracted into the main body, when the sensor detects the obstacle.

11. The robot vacuum cleaner of claim 10, wherein the controller is further configured to repeat a cleaning process when the obstacle detected by the sensor is a corner.

12. The robot vacuum cleaner of claim 1, wherein the shutter is configured to contact the surface at the position adjacent to the obstacle while the main body is being driven.

13. The robot vacuum cleaner of claim 12, wherein at least a part of the shutter is formed of an elastic material.

14. The robot vacuum cleaner of claim 1, wherein at least a portion of the shutter is configured to contact the surface and is formed of an elastic material.

15. The robot vacuum cleaner of claim 1, wherein
the intake includes a plurality of nozzle blades arranged to define a suction path, and
the plurality of nozzle blades are detachably mounted on the intake.

16. The robot vacuum cleaner of claim 15, wherein the plurality of nozzle blades comprise:
a main fluid path former configured to define a first portion of the suction path connected to the intake from a front of the intake; and
a flank fluid path former configured to define a second portion of the suction path connected to the intake from a flank of the intake.

17. The robot vacuum cleaner of claim 16, wherein the main fluid path former comprises a plurality of main fluid path blades configured to guide air flowing in through the first portion of the suction path to the intake.

18. The robot vacuum cleaner of claim 16, wherein the flank fluid path former comprises a flank fluid path blade arranged in a slanted manner relative to a flank of the intake to guide air into the second portion of the suction path.

19. The robot vacuum cleaner of claim 18, wherein at least a part of the flank fluid path blade includes an elastic material.

* * * * *